(12) United States Patent
Chandramohan et al.

(10) Patent No.: US 8,996,917 B1
(45) Date of Patent: Mar. 31, 2015

(54) SYSTEMS AND METHODS FOR TESTING A CENTRAL CONTROLLER IN A CENTRALLY MANAGED NETWORK

(71) Applicant: Google Inc., Mountain View, CA (US)

(72) Inventors: Vijay Chandramohan, Sunnyvale, CA (US); Sushant Jain, Sunnyvale, CA (US); Alok Kumar, Fremont, CA (US); Anand Raghuraman, Campbell, CA (US)

(73) Assignee: Google Inc., Mountain View, CA (US)

( * ) Notice: Subject to any disclaimer, the term of this patent is extended or adjusted under 35 U.S.C. 154(b) by 209 days.

(21) Appl. No.: 13/709,619

(22) Filed: Dec. 10, 2012

(51) Int. Cl.
*G06F 11/00* (2006.01)
(52) U.S. Cl.
CPC .................. *G06F 11/008* (2013.01)
USPC .................. 714/28; 714/26; 714/27
(58) Field of Classification Search
USPC ...................................... 714/26–28
See application file for complete search history.

(56) References Cited

U.S. PATENT DOCUMENTS

| | | | |
|---|---|---|---|
| 5,748,617 A * | 5/1998 | McLain, Jr. ............ | 370/244 |
| 6,961,313 B1 * | 11/2005 | Gaspar .................. | 370/242 |
| 7,047,176 B2 * | 5/2006 | Klevans et al. ........ | 703/21 |
| 7,596,484 B1 * | 9/2009 | Patel et al. ............ | 703/26 |
| 7,698,121 B2 * | 4/2010 | Steenkiste et al. ..... | 703/23 |
| 8,028,188 B2 * | 9/2011 | Karthikeyan et al. ... | 714/2 |
| 8,310,952 B2 * | 11/2012 | Hatley et al. ......... | 370/252 |
| 8,402,312 B2 * | 3/2013 | Dhanapal et al. ...... | 714/28 |
| 8,707,100 B2 * | 4/2014 | Saha et al. ........... | 714/26 |
| 8,738,958 B2 * | 5/2014 | Goroff et al. ......... | 714/4.1 |
| 2006/0143522 A1 * | 6/2006 | Multhaup et al. ...... | 714/28 |
| 2010/0100767 A1 * | 4/2010 | Liu et al. ............. | 714/28 |
| 2010/0131799 A1 * | 5/2010 | Wu et al. ............. | 714/26 |
| 2011/0173498 A1 * | 7/2011 | Hatley et al. ......... | 714/32 |
| 2013/0044604 A1 * | 2/2013 | Hatley ................. | 370/241 |
| 2013/0096904 A1 * | 4/2013 | Hui et al. ............. | 703/21 |
| 2014/0115394 A1 * | 4/2014 | Fattah ................. | 714/32 |

* cited by examiner

*Primary Examiner* — Joshua P Lottich
(74) *Attorney, Agent, or Firm* — Edward A. Gordon; Foley & Lardner LLP

(57) ABSTRACT

Systems and methods are described herein for validating operation of a centrally managed network. A central controller is configured to manage a network, and an emulator configured to emulate one or more nodes in the network is connected to the central controller. The emulator determines a state value for one or more nodes in the network, and the state value represents whether the respective node is in error. The emulator receives a first plurality of policies including instructions for the nodes in the network, and whether the policies are consistent with one another is identified.

32 Claims, 18 Drawing Sheets

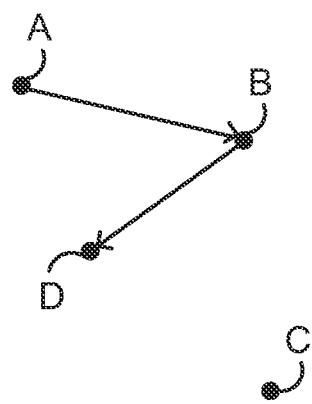
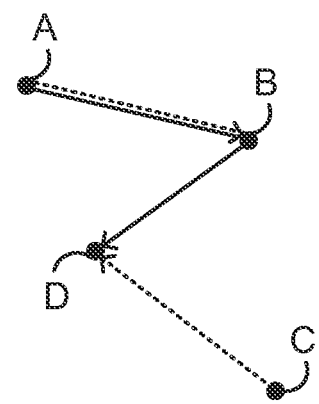
FIG. 15B
FIG. 15C
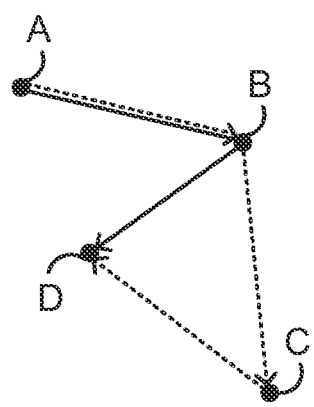
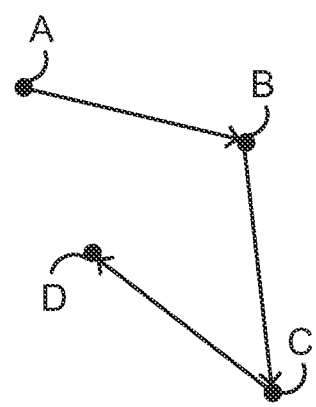
FIG. 15D
FIG. 15E

SYSTEMS AND METHODS FOR TESTING A CENTRAL CONTROLLER IN A CENTRALLY MANAGED NETWORK

FIELD

In general, the systems and methods described herein relate to testing and improving the performance of a centrally managed network.

BACKGROUND

A centrally managed computer network includes a central controller controlling operation of several nodes that perform certain functions. The functions may be the same or different across the nodes, and the central controller typically controls their operation by executing several steps. First, the central controller periodically gathers the state of each node and builds a global view of the overall network. Second, the central controller computes an optimal policy for each node based on the global information. Third, the central controller distributes the optimal policy to each node, which programs itself to function accordingly.

The central controller gathers information about the network such as the network topology, a traffic demand of the network, or routing plans used by the network to form a global view of the overall network. Based on the global view, the central controller configures a set of routing policies for the network. In particular, the routing policies dictate how data should travel through the network and include sets of data forwarding instructions for each node in the network. For example, the policy may indicate that identification of the next immediate destination for the data packet may be dependent on the size, application, and/or destination address of a data packet. It is desirable for the routing policies to give rise to optimal or near optimal network operation, such as resulting in high data throughput, high efficiency, and/or low cost. Systems and methods to test the performance of a central controller in a centrally managed computer network would therefore be of great benefit in network management.

SUMMARY

Accordingly, the systems and methods described herein include, among other things, validating operation of a centrally managed network. A central controller is configured to manage a network, and an emulator configured to emulate one or more nodes in the network is connected to the central controller. The emulator determines a state value for one or more nodes in the network, and the state value represents whether the respective node is in error. The emulator receives a first plurality of policies including instructions for the nodes in the network, and whether the policies are consistent with one another is identified.

In one embodiment, the emulator is configured to emulate all nodes in the network that directly interface with the central controller.

In one embodiment, determining a state value for one or more nodes comprises determining state values for all nodes in the network.

In one embodiment, the emulator selects a node and verifies that the instructions for the selected node are consistent with the state values of the selected node and neighboring nodes sharing direct communication links with the selected node. In one embodiment, the emulator selects a node and verifies that the instructions for the selected node are consistent with the state values for all other nodes in the network.

In one embodiment, the emulator updates the state value for a node in the network, wherein the updated state value is based at least in part on the received instructions for the node. Optionally, the emulator receives another plurality of policies including instructions for the nodes in the network, and whether the policies are consistent with one another is identified.

In one embodiment, the policies are routing policies including data forwarding instructions for the nodes. Optionally, determining that the routing policies are inconsistent with one another comprises identifying data forwarding instructions for a first node in the network that conflict with data forwarding instructions for another node in the network.

In one embodiment, the emulator receives a second plurality of policies and determines whether the first plurality of policies, the second plurality of policies, and the node state values are consistent with one another during a transition from the first plurality of policies to the second plurality of policies.

In one embodiment, the determining of the state value for one or more nodes in the network includes assigning a random state value for the one or more nodes. In one embodiment, the determining of the state value for one or more nodes in the network includes assigning a pre-determined state value for the one or more nodes.

In one embodiment, a plurality of nodes are disconnected from the central controller, and the emulator is configured to emulate the disconnected plurality of nodes. Optionally, one or more policies are selected from the plurality of policies, and disconnecting the plurality of nodes includes disconnecting those nodes associated with the selected policies.

In one embodiment, the emulator transmits the determined state values to the central controller, and the central controller configures the first plurality of policies based at least in part on the determined state values.

In one embodiment, the emulator stores a network map of the network.

According to another aspect, the disclosure relates to an apparatus to carry out the method described above. In particular, an emulator is described for validating policies for a network having a central controller for managing the network. The emulator comprises an error scenario generator configured to determine a state value for one or more nodes in the system. The state value represents whether the respective node is in error. The emulator further comprises a central controller interface configured to receive a first plurality of policies from the central controller. The policies include instructions for the nodes in the network. In addition, the emulator comprises an emulation engine configured to identify whether the policies are consistent with one another.

In one embodiment, the emulator is configured to emulate all nodes in the network that directly interface with the central controller.

In one embodiment, the error scenario generator determines state values for all nodes in the network.

In one embodiment, the emulation engine is further configured to select a node and verify that the instructions for the selected node are consistent with the state values of the selected node and neighboring nodes sharing direct communication links with the selected node. In one embodiment, the emulation engine is further configured to select a node and verify that the instructions for the selected node are consistent with the state values for all other nodes in the network.

In one embodiment, the error scenario generator is further configured to update the state value for a node in the network. The updated state value is based at least in part on the received instructions for the node.

In one embodiment, the central controller interface is configured to repeatedly receive policies from the central controller. The emulation engine is configured to repeatedly identify whether the policies are consistent with one another. In addition, the error scenario generator is configured to repeatedly update the state value for a node in the network.

In one embodiment, the policies are routing policies including data forwarding instructions for the nodes. Optionally, the emulation engine determines that the routing policies are inconsistent with one another by identifying data forwarding instructions for a first node in the network that conflict with data forwarding instructions for another node in the network.

In one embodiment, the central controller interface is further configured to receive a second plurality of policies. In addition, the emulation engine is further configured to determine whether the first plurality of policies, the second plurality of policies, and the node state values are consistent with one another during a transition from the first plurality of policies to the second plurality of policies.

In one embodiment, the error scenario generator determines the state value for one or more nodes in the network by assigning a random state value for the one or more nodes. In one embodiment, the error scenario generator determines the state value for one or more nodes in the network by assigning a pre-determined state value for the one or more nodes.

In one embodiment, the emulator is configured to emulate a plurality of nodes in the network that are disconnected from the central controller. Optionally, the emulator further comprises a policy selector for selecting one or more policies from the plurality of policies, wherein the disconnected nodes are associated with the selected policies.

In one embodiment, the central controller interface is further configured to transmit the determined state values to the central controller, and the central controller configures the first plurality of policies based at least in part on the determined state values.

In one embodiment, the emulator further comprises a database for storing a network map of the network.

BRIEF DESCRIPTION

The above and other advantages of the disclosure will be apparent upon consideration of the following detailed description, taken in conjunction with the accompanying drawings, in which like reference characters refer to like parts throughout, and in which.

Figure 15A:
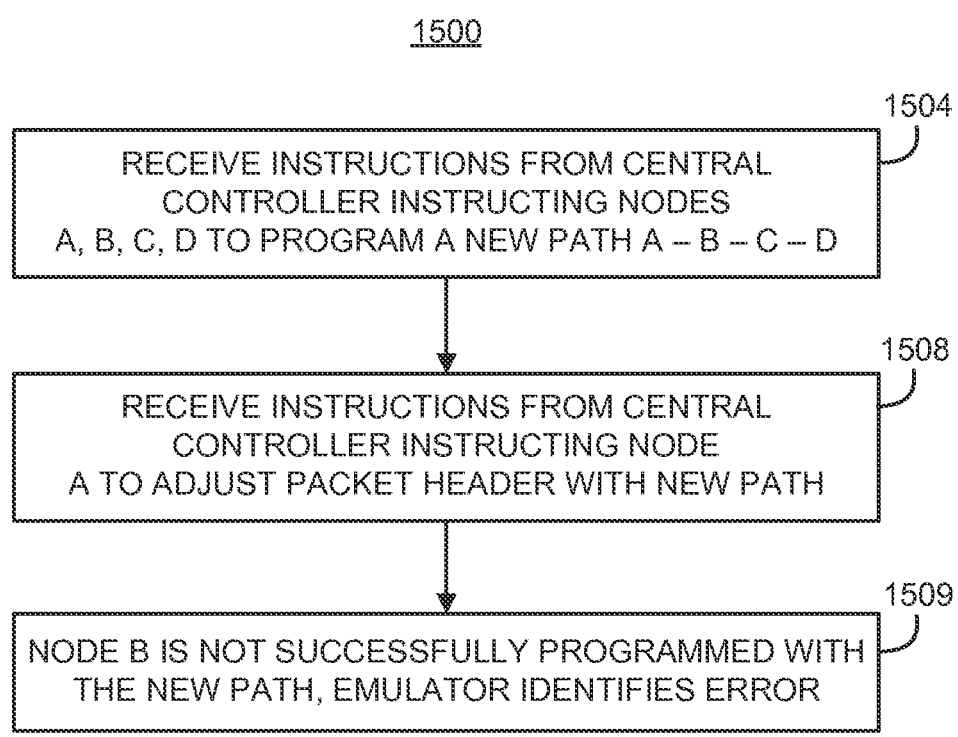

FIG. 15A is a flow diagram depicting a process, on the emulator, for identifying an error during a transition from one set of routing policies to another set of routing policies, according to an illustrative implementation of the disclosure; and FIGS. 15B-15E are example portions of a network during a transition from one set of routing policies to another set of routing policies, according to an illustrative implementation of the disclosure.

DETAILED DESCRIPTION

To provide an overall understanding of the systems and methods described herein, certain illustrative embodiments will now be described, including a system for validating routing policies in a centrally managed system. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

The present disclosure provides an emulator for testing the resilience of a central controller in a centrally managed system to various error combinations in a network. In particular, the emulator provides error scenarios, which are various forms of network error combinations, to a central controller, receives routing policies from the central controller, and subjects the received routing policies to a rigorous series of protocol validation tests to identify any resulting invalid network operations. The routing policies include data forwarding instructions for nodes in the network.

Figure 6:
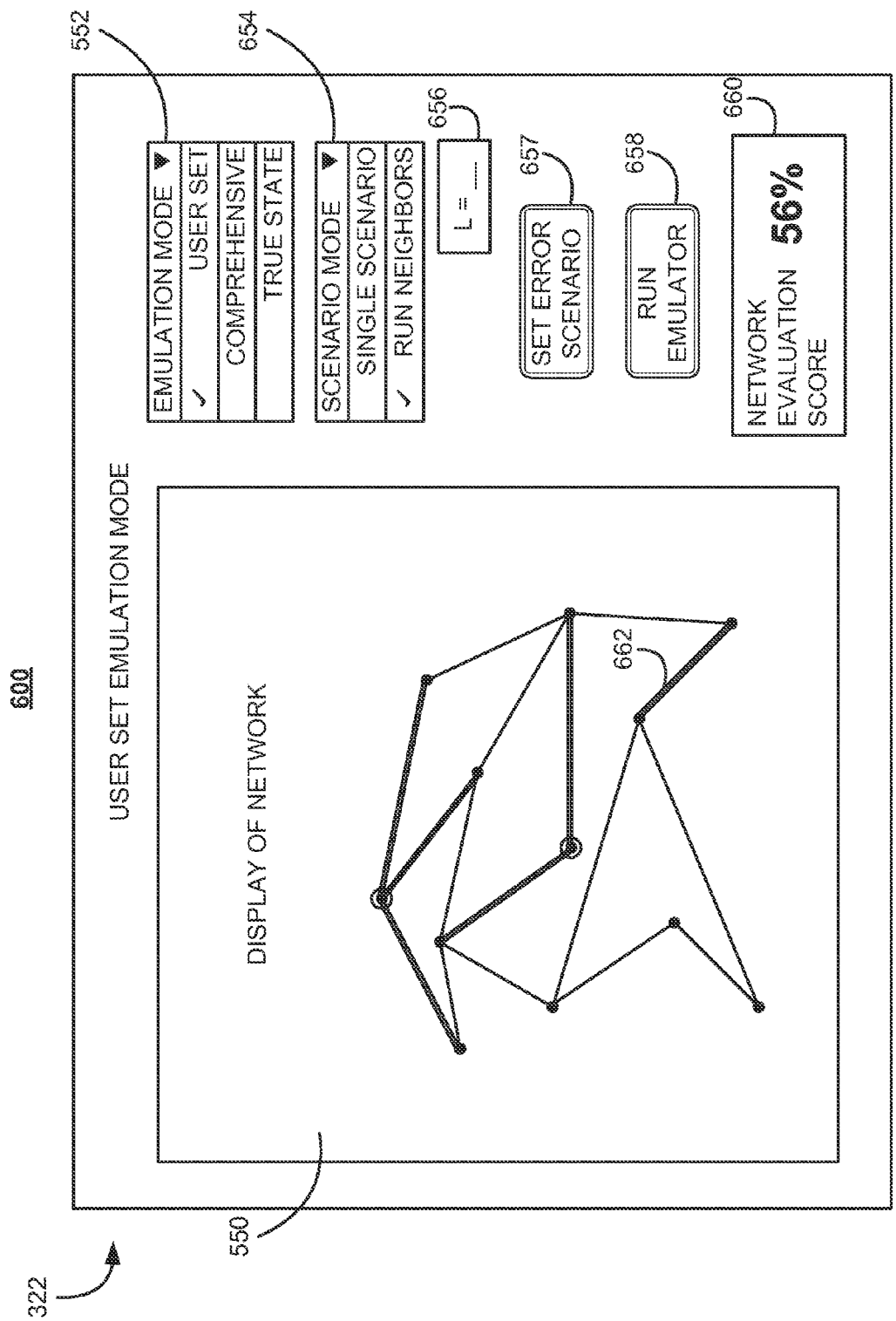
FIG. 6 is a diagram of an exemplary display of a user interface for running an emulator operating in a user set emulation mode, according to an illustrative implementation of the disclosure.
Figure 7:
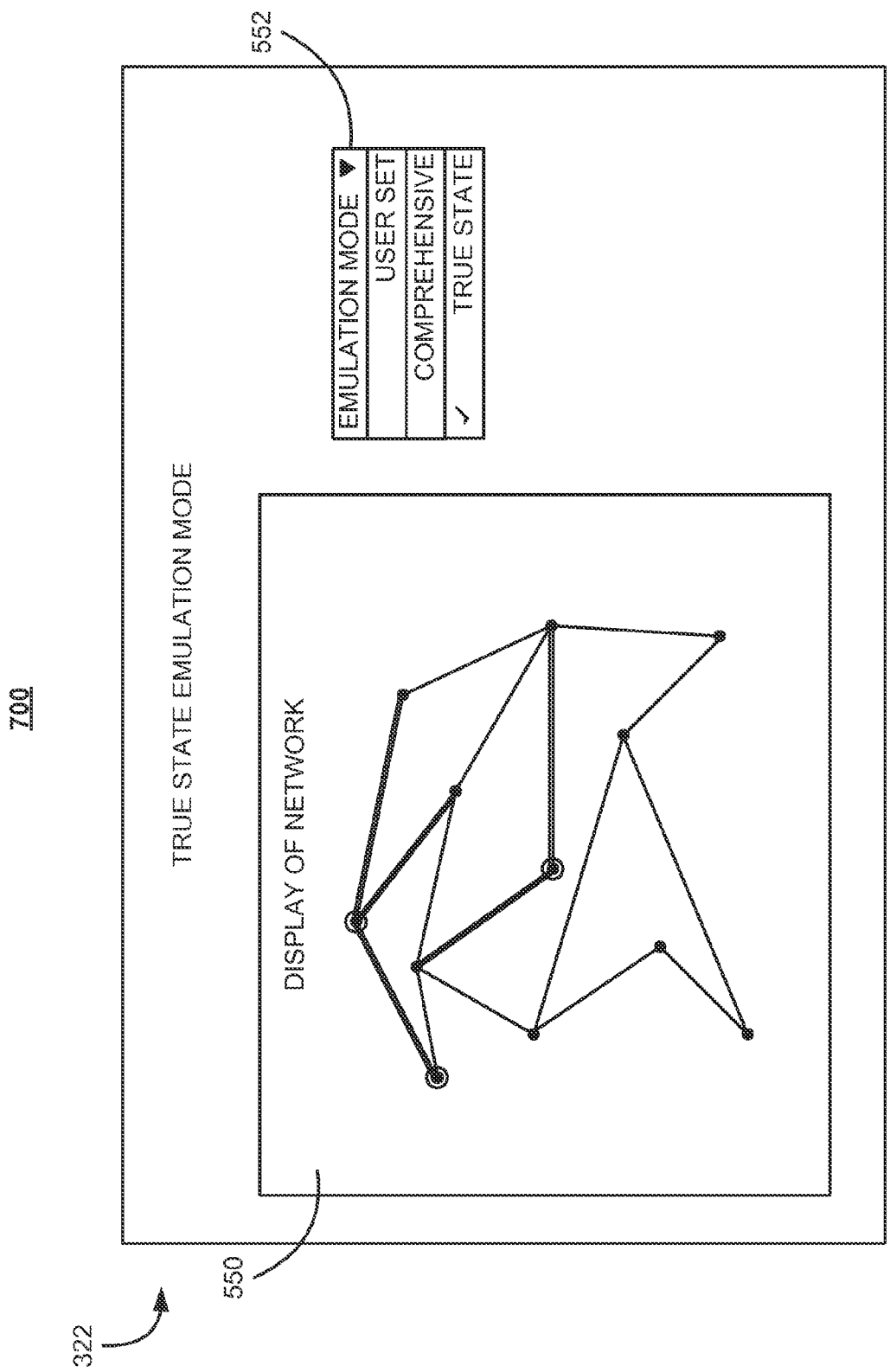
FIG. 7 is a diagram of an exemplary display of a user interface for running an emulator operating in a true state emulation mode, according to an illustrative implementation of the disclosure.

The systems and methods of the present disclosure may be described in more detail with reference to FIGS. 1-11. More particularly, an exemplary emulator and its components are described with reference to FIGS. 1-4. Specific implementations of user displays are depicted in FIGS. 5-7. The system may provide information about performing the emulation as described with reference flow charts in FIGS. 8-12.

Figure 1A:
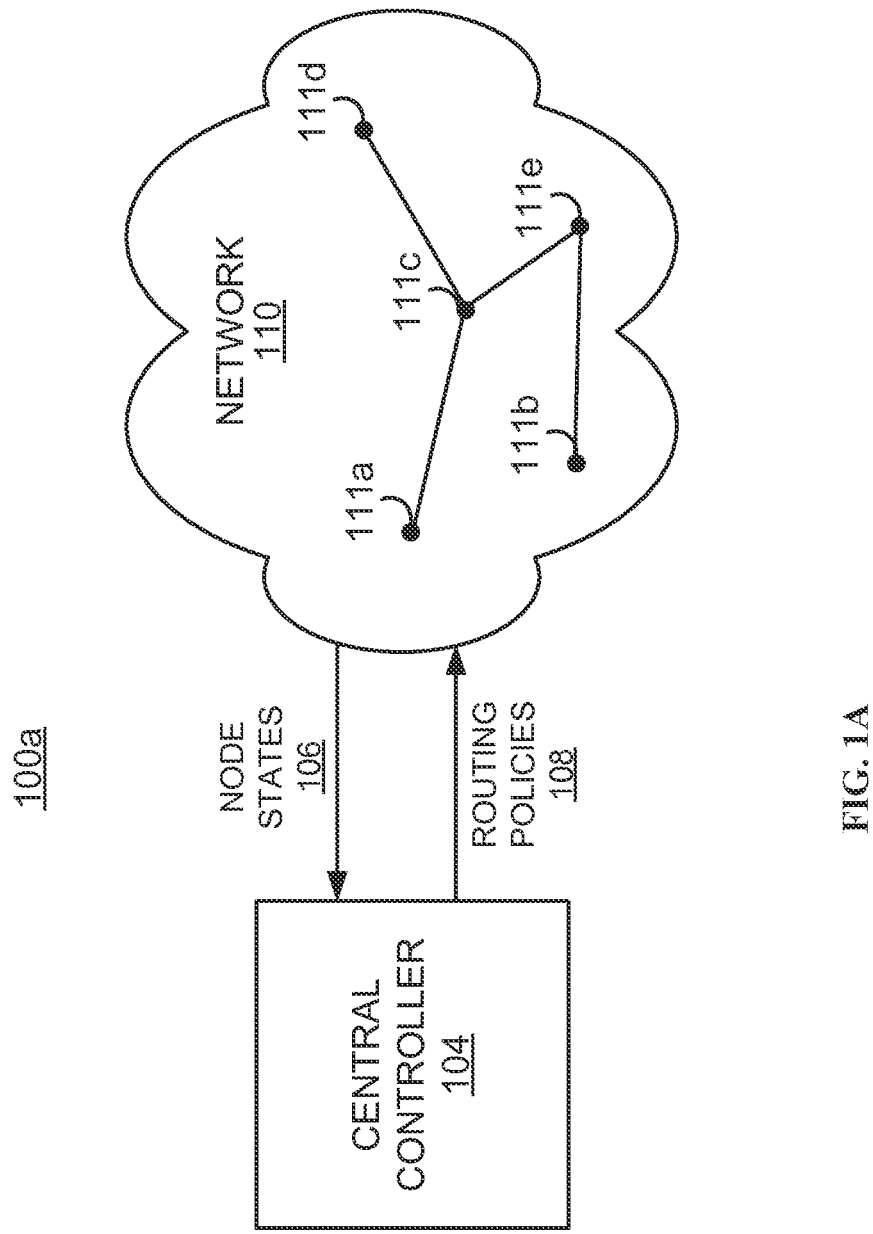
FIG. 1A is a block diagram of a centrally managed system, according to an illustrative implementation of the disclosure.

FIG. 1A is an illustrative block diagram of a centrally managed system 100a. System 100a includes a central controller 104 and a network 110 with nodes 111a-111e (generally, node 111). Network 110 is an infrastructure that interconnects various nodes 111 and provides possible paths for transmitting data between two nodes 111. In addition, network 110 receives routing polices 108 from central controller 104. Routing policies 108 include forwarding rules describing how nodes 111 should forward data packets and will be described in more detail below.

Network 110 may be a computer network interconnecting multiple nodes, which may include network devices such as routers, switches, computers, servers, or any other suitable network device. In particular, network 110 may be a local area network, a backbone network, or any other suitable network that interconnects various network devices or pieces of network. Network 110 may interconnect any number of network devices in limited or extended geographical locations. Network 110 may be a computer network, a sensor network, or any other suitable system that includes nodes for performing certain functions.

In network 110, packets of data flow in the form of traffic along network paths, which sometimes include multiple intermediate nodes. In particular, a data packet originates at a first node and often gets forwarded to multiple intermediate nodes before finally reaching its destination at a final node. In an example, a data packet may be generated at a first node. In particular, the first node may include a sensor for measuring some physical quantity, for example. Alternatively, the data packet may be received by the first node from a user (i.e., a user uploads some data to a computer or server at the node) or an external device (i.e., from a different network). In general, a data packet may originate at a first node in any suitable manner.

A node 111 determines a data packet's next immediate destination (i.e., intermediate nodes or final node) based at least in part on information marked on the data packet and a routing policy 108. When this address is identified, node 111 forwards the packet over a network link to the packet's next immediate destination. Network links may be direct connections between two nodes 111 and may be formed over fiber optic cable connections, over wireless connections, or any other transmission mechanism capable of transferring data from one node to another node. In addition, two nodes may be connected to each other over two distinct links. In particular, one link may be used to transmit control signals, while the other link may be used to transmit data signals between the two nodes, for example. Multiple links between two nodes may also be used for failsafe operation.

A node 111 may include a router, a switch, a computer, a server, or any other suitable network device whose functions include receiving incoming packets and forwarding the packets to another node. In particular, the routing policies 108 received from central controller 104 provide instructions for how the nodes should forward the data packets. For example, a routing policy 108 may include the use of one or more routing tables. A routing table may be stored directly in a node, or a node may access a routing table from a separate device. The routing table may include information related to the network topology immediately surrounding the node and may be used by a node to identify a next destination for a particular data packet. Some information associated with the data packet may be used in conjunction with the routing table to identify the next destination. Examples of such information associated with a data packet includes the size of a data packet, the user data, the control data, the destination address, quality of service information, or any other suitable information associated with a data packet that may affect a next destination of the data packet. In particular, this information may be available in a packet header or trailer.

Network 110 transmits node states 106 of nodes 111 to central controller 104. In particular, one or more nodes 111 in network 110 may directly interface with central controller 104; an interfacing node 111 may provide its own node state 106, and optionally provides a node state of at least another node 111. In certain implementations, an interfacing node 111 aggregates the state of several other nodes. In this manner, the burden on the central controller 104 is reduced because the central controller 104 only directly interfaces with a subset of the nodes 111 rather than all of the nodes 111.

In certain implementations, a node state 106 indicates a status of a node 111 in network 110. As an example, each node 111 in network 110 may have an associated node state 106, which is indicative of a health status of the node 111. In particular, node state 106 may be a binary variable to indicate that node 111 is either healthy or in error. In another example, node state 106 is indicative of other information of node 111, such as a capacity of the node. In particular, different routers may have different capacities, such that it may be desirable to have more data sent through routers with larger capacities compared to routers with smaller capacities. In this case, providing node capacity information to central controller 104 may give rise to routing policies 108 that make efficient use of relative capacities of various nodes in network 110. In another example, the node state may be indicative of a temporary disabling of the node, such as for maintenance by a network administrator. In another example, the node state may be indicative of packet drop statistics in the node, i.e., a number of data packets dropped in a time interval such as the last 1, 5, 10 minutes, or any other suitable time interval. In another example, the node state may contain a current routing policy for a node that is enforced by central controller 104.

Furthermore, node states 106 may also provide information regarding link states in network 110. In particular, if a node 111 is in error or is otherwise incapable of receiving and/or forwarding data packets, the links between the node and its direct neighbors should not be used. In another example, a link may be down even if both of the nodes 111 at the link's endpoints are operational. In particular, a link may be temporarily disabled, and a corresponding link state may be indicative that the link is not operational. In another example, a link state may be indicative of a capacity of a corresponding link. In another example, multiple links may connect two nodes for fail safe operation, and a link state may be indicative of a number of multiple links. As described herein, node states 106 refers to the state of the nodes 111, the state of the links connecting the nodes 111, and any other information related to a state of network 110.

In addition to receiving node states 106, central controller 104 may also receive a network map of network 110. Network 110 may provide the network map directly to central controller 104, or another device may provide the network map. The network map may include information about network 110 such as the locations of various nodes 111, the physical interconnections of nodes 111 (i.e., the network links that directly connect two nodes), and/or node identifiers identifying nodes 111. The network map may be in any form, such as a data structure, a network table, a graphical image, or any other suitable way of representation network information. For example, each node 111 may be labeled with a node identifier such as an address, a data string, or any other suitable label that uniquely identifies the node. Updates regarding the network map may be provided to central controller 104 as necessary. Network 110 may transmit node states 106 to central controller 104 in the form of a data structure including a list of node identifiers (corresponding to the node identifiers in the network map, for example) and the associated node states 106. Any other suitable way of providing node states 106 and information about network 110 to central controller 104 may also be used.

Central controller 104 may also receive some global information that is used for the computation of efficient routing policies. For example, central controller 104 may receive a state of the current traffic (or the traffic demand) between different end points in the network. As an example, this information may include a 100 GB high priority demand between two geographical regions, and a 20 GB low priority demand between two other geographical regions. In this case, when determining the routing policies, central controller 104 may ensure that the routing policies associated with the specified regions are consistent with their demands. As another example, the information may include relative priority demands. In this case, central controller 104 may ensure that routing policies associated with certain high priority regions are consistent with the high priority demands before considering lower priority regions.

In some embodiments, network 110 provides periodic updates of node states 106 to central controller 104. In particular, a time interval is associated with the periodic updates, such a new update is provided each 100 ms, 1 ms, 1 minute, or any other suitable time interval. The length of the time interval may be appropriately adjusted to manage a tradeoff between a cost of providing the updates and maintaining an accurate depiction of node states 106 at central controller 104. For example, a long time interval may be desirable if providing updates is burdensome. However, a long time interval may result in network 110 executing obsolete routing policies 108, or routing policies 108 that were configured based on an obsolete set of node states 106, for an extended amount of time. In particular, using obsolete routing policies 108 may have undesirable consequences such as data packet loss. Thus, a shorter time interval may be desirable if providing updates is efficient, and/or if data packet loss is intolerable. In an example, the length of the time interval is based on a maximum amount of time that it is acceptable to operate under obsolete routing policies 108. The time interval may be determined based on an estimated amount of tolerable data packet loss. Furthermore, the time interval corresponding to the periodic updates may be fixed, or may be changed depending on changes in network 110.

In other embodiments, after providing an initial set of node states 106, network 110 provides updates to central controller 104 only when changes to the node states 106 occur. For example, when at least one node state changes, network 110 provides the updated node state to central controller 104. Otherwise, no node state updates are provided. Network 110 may provide an update of just the updated node state, or may provide an update of all the node states for redundancy. This option may be desirable if it is expected that node states would not change often, and if providing node states 106 to central controller 104 is expensive.

Central controller 104 configures routing policies 108 based at least partially on inputs such as node states 106 received from network 110 and the network map. In an example, the node state 106 of node 111a may indicate that node 111a is in error, or has a very low capacity, for example. In this case, central controller 104 configures routing policies 108 that will direct minimal or no data traffic through node 111a.

Central controller 104 may configure routing policies 108 by executing an algorithm operating on inputs such as the network map and received node states 106. In addition, central controller 104 may have one or more preconfigured routing policies. These preconfigured routing policies may be set by a system manager such as a network administrator for specific end points in network 110. The algorithm may have been written or programmed based on networks with certain characteristics under certain error combinations of node states 106. As an example, a software programmer may have written the algorithm based a network with N nodes, when fewer than N/2 nodes are in error at any given time. However, it is desirable to test the reliability of the performance of central controller 104 by comprehensively testing all possible error combinations, such as when more than N/2 nodes are in error.

In addition, it is desirable to test the performance of central controller 104 during transitional phases. In particular, to transfer a set of routing policies 108 to network 110, central controller 104 may use a communication protocol that involves transmitting the set of routing policies 108 in multiple discrete steps. During execution of a multiple-step communication protocol, central controller 104 transmits multiple discrete sets of instructions directed towards nodes 111 for how to forward various data packets. Thus, during this transitional phase, different nodes 111 may have different (and possibly conflicting) routing policies 108. In this way, network 110 is particularly vulnerable to inconsistent, invalid, or inefficient network operations during transitional phases.

Thus, while central controller 104 executes the multi-step protocol to transition from one set of routing policies to another set of routing policies, various error conditions may occur (e.g., transient remote procedure call errors, node failures, etc.). Therefore, it is desirable to execute local and global validation tests at each step of the transition phase, or at each discrete communication from central controller 104. This process is explained in more detail in relation to FIGS. 13-15.

Thus, under certain conditions, routing policies 108 provided by central controller 104 may give rise to invalid network operations. In one example of an invalid network operation, a node may be instructed to insert itself into a path that does not include the node. In another example, a node may be instructed to remove itself from a path when there is still active data traffic traversing the path. Removal of the node from an active path would lead to a loss of data packets.

Therefore, Applicants have recognized that it may be desirable to have a mechanism for validating the routing policies 108 provided by central controller 104 and for identifying routing inconsistencies, inefficiencies, or any other invalid network operations. One way to do this is to iteratively select each node in a network and perform validation tests to check for any of these undesirable operations. In addition, it is desirable to validate routing policies 108 for various error combinations and corner cases that may have not been considered when the central controller software was constructed.

Figure 1B:
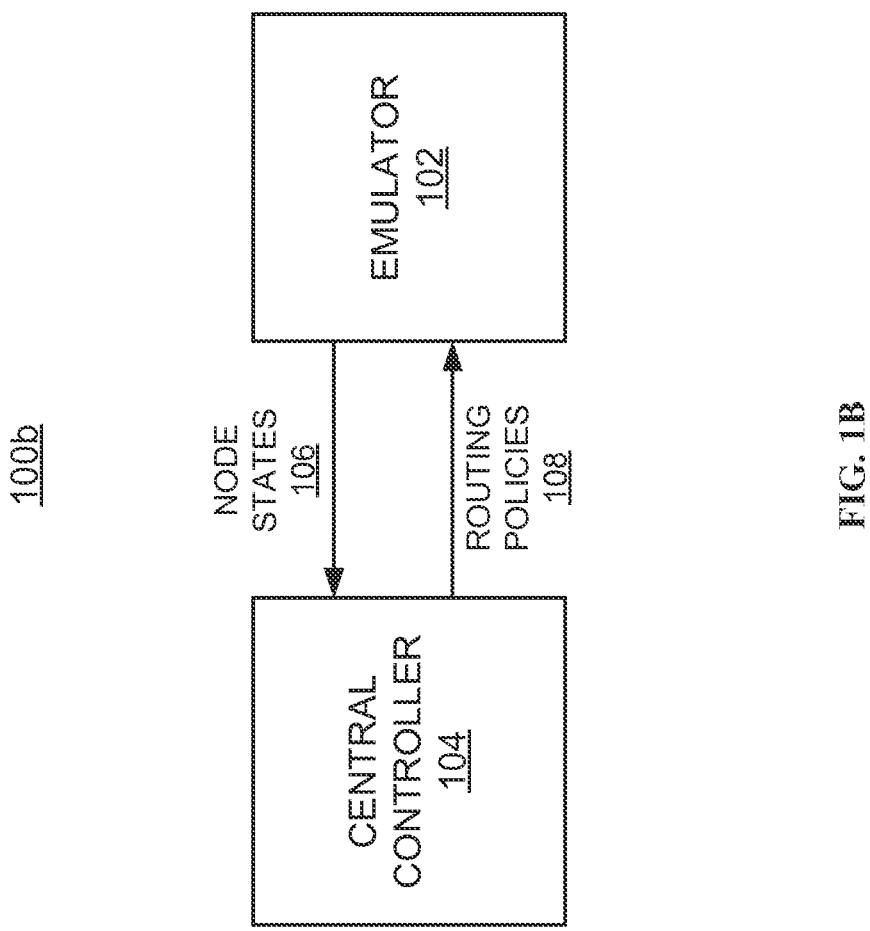
FIG. 1B is a block diagram of a centrally managed system including an emulator emulating the behavior of a network, according to an illustrative implementation of the disclosure.

FIG. 1B is a block diagram of a system 100b for validating routing policies 108 provided by central controller 104. System 100b includes emulator 102 and central controller 104, which behaves as if emulator 102 were network 110. In particular, central controller 104 may be disconnected from nodes 111 in network 110 and connected to emulator 102. In an example, the disconnected nodes 111 correspond to nodes 111 associated with one or more selected routing policies 108. To emulate network 110, emulator 102 has knowledge of a network map associated with network 110, provides node states 106 to central controller 104, and receives routing policies 108 from central controller 104. Thus, emulator 102 emulates the behavior of all or substantially all of the nodes in network 110 that directly interface with central controller 104. In certain implementations, emulator 102 emulates only a subset of the nodes in the network 110. Emulator 102 may also emulate a single node in the network. Generally, emulator 102 may emulate any number of nodes in the network 110 as desired without departing from the scope of the present disclosure.

Emulator 102 emulates operation of network 110 by using error scenarios, which include any combination of node states 106 for nodes 111. In particular, for one or more nodes 111, emulator 102 is configured to emulate the node's normal behavior (i.e., a healthy state) in addition to various error or failure scenarios to which the node is susceptible (i.e., an errored state), such as router failure, link failure, router restart, transient remote procedure call errors, a drop in link capacity, a difference in response delays for remote procedure calls, or any other suitable error associated with a node in a network. These errors may result in a temporary inability to communicate with a node. As an example, some errors may be self-correcting after a particular amount of time, such as a transient remote procedure call error. Different nodes can exhibit different errors, and it is desirable to test different combinations of these errors. Emulator 102 internally maintains node states 106, updating the states as various normal and error scenarios are emulated for the nodes 111. In an example, emulator 102 emulates the behavior of all nodes that directly interface with central controller 104 and stores the states of all nodes 111 in network 110 at one place to maintain a global state or view of the system. By performing the emulation and maintaining the system's global state at one place, emulator 102 is able to run global validation tests for every operation from central controller 104 to any node 111.

In addition to maintaining node states 106, emulator 102 internally performs several tests to validate sets of received routing policies 108. In addition to testing whether a given set of routing policies 108 is valid, emulator 102 also tests for valid routing policies 108 during the transitional phase described in relation to FIG. 1A. These tests may be performed by emulator 102 for identifying whether the routing policies 108 are consistent with one another or for identifying whether the routing policies 108 are consistent with the node states 106. In particular, emulator 102 performs these tests for each discrete communication from central controller 104.

Emulator 102 may update node states 106 to reflect any changed states. For example, the updated states may be based on the results of the validation tests. In particular, if emulator 102 determines that a received instruction from central controller 104 results in a node error, and the node was previously healthy, emulator 102 would update the node's state to reflect the error. In another example, emulator 102 may assign a random state value for a node state 106. In particular, emulator 102 may use a random number generator to determine a random state value. In general, emulator 102 may assign state values for node states 106 based on a user input, network constraints, previously tested state values, or any other suitable technique for assigning state values.

The tests that emulator 102 performs may generally be categorized as local or global validation tests. In general, local validation tests verify that the local network paths dictated by the routing policies 108 are consistent with the current state of a node and its neighbors. Global validation tests identify situations in which global network operation is invalid, even when one or more individual nodes are determined to be locally valid.

In local validation tests, emulator 102 verifies that the routing instructions for a node are consistent for the current state of the node and the current states of the node's immediate neighbors, which share direct communication links with the node. In particular, nodes may be iteratively selected, and local validation tests may be performed on the selected node(s) and the neighbors. In general, local validation tests consider inconsistent routing policies. In one example of a local validation test, emulator 102 determines whether a node has been instructed to forward data to a neighbor in an error state. Forwarding data packets to a node in error would result in a loss of data packets. Similarly, emulator 102 may determine whether a node has been instructed to forward data along an unavailable link. In another example, a node should not be instructed to insert itself into a path that does not include the node. In another example of a local validation test, emulator 102 may identify conflicting paths with the same destination. In another example, emulator 102 identifies malformed messages from central controller 104. A malformed message may include some required field that are missing or improperly filled.

Emulator 102 may perform global validation tests in addition to local validation tests. Global validation tests may identify situations in which global network operation is invalid, even when one or more individual nodes have passed all local validation tests. In global protocol validation tests, emulator 102 verifies that the state and routing policies of all the nodes 111 in network 110 are consistent with one another. In particular, nodes may be iteratively selected, and global validation tests may be performed on the selected node(s). Both local and global validation tests are rigorously applied during each step of the transition phase as described above. A transitional phase arises during a transition from one set of routing policies to another. The new set of routing policies may be provided by central controller 104 based on a change in node states 106. As described in relation to FIG. 1A, network 110 is particularly susceptible to invalid network operations during a transitional phase. In an example of a global validation test, emulator 102 determines whether a first node is instructed to send a data packet through a path when a second node in the path is not successfully configured with the same routing policy. In particular, the second node may be operating under an obsolete routing policy, and has not yet been informed of the routing policy under which the first node is already operating. In another example, a new routing policy may instruct a middle node in an active path to remove itself from the path. However, if the other nodes in the path have not yet been informed of the new routing policies, then they will continue forwarding data to the middle node. This would lead to dropped data packets if the middle node begins operating under the new routing policy before the other nodes in the path receive the new instructions. In another example of a global validation test, emulator 102 may be configured to detect inefficient routing policies, such as those that give rise to looped network paths. In a network loop, a data packet is forwarded from a first router to one or more other routers before being returned to the first router. Network paths with loops are problematic because data packets could potentially travel endlessly in a loop. Another way to detect an inefficient routing policy 108 is to compute a cost of transmitting a data packet along a path dictated by the routing policy 108 and compare the computed cost to some expected minimum value. In another example, network paths may be associated with unique identifiers, such as an address. A packet header in a data packet may include the identifier for the network path along which it is desirable for the data packet to be forwarded. In an example of a global validation test, emulator 102 is configured to ensure that these identifiers are unique and that the same identifier is not used for more than one distinct network path.

It may be desirable for emulator 102 to continuously emulate different error scenarios for the network and perform protocol validation tests as central controller 104 reacts to the scenario changes. The different error scenarios may include a comprehensive set of all possible node error combinations for network 110. Alternatively, it may be determined that some sets of error combinations are more likely to occur than other sets. For example, one error at a node may tend to give rise to another error at the same node or a different node. In this case, the more likely error combinations may be tested more thoroughly than error combinations determined to be less likely. In addition, emulator 102 may emulate various combinations of random errors. To test different error combinations, emulator 102 may randomly impose one or more additional errors on a node, and emulator 102 may do this independently across multiple nodes. Continuously imposing random errors may give rise to unforeseen corner error conditions that helps to test the resilience of the system under the various error conditions.

Upon identifying an invalid network operation, emulator 102 may alert a user (such as a network administrator or another appropriate authority) with information indicative of the invalid network operation, and may also provide the parameters of the emulation that gave rise to the network operation. Emulation parameters may include the node states 106, the routing policies 108, whether the invalid network operation occurred in the transitional phase, or any other suitable data related to the emulation. The network administrator may use the alert and information to determine a way to prevent the invalid network operation in the future. In some implementations, emulator 102 may provide a suggested alternative routing policy upon identifying an invalid network operation. As an example, upon identifying a loop in a network path, emulator 102 may suggest that the one or more routing policies 108 giving rise to the loop should be appropriately adjusted.

Emulator 102 is a computing device that may include several components such as a processor, memory device, communications interface unit, and input/output controller. The memory device may be configured to store the network map, node states 106, routing policies 108, invalid network operations, or any other suitable data for storage. In addition, the memory device may store computer executable instructions that, when implemented by the processor, cause the processor to perform local and global validation tests of the routing policies. The communications interface unit may include a unit for interfacing between emulator 102 and central controller 104. These components are described in more detail in relation to FIGS. 2-4.

Figure 2:
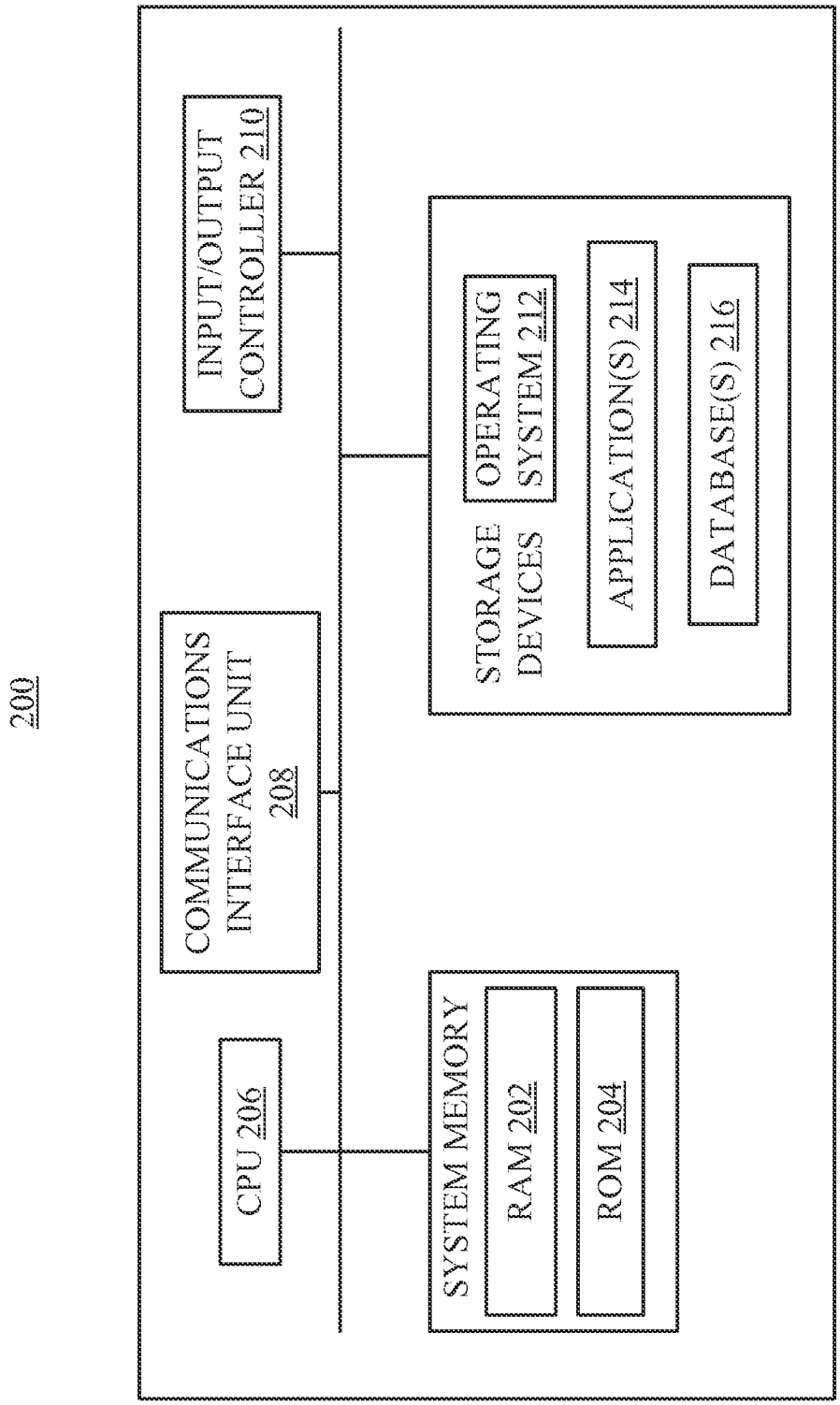
FIG. 2 is a block diagram of a computing device for performing any of the processes described herein, according to an illustrative implementation of the disclosure.

FIG. 2 is a block diagram of a computing device, such as any of the components of the system of FIG. 1, for performing any of the processes described herein. Each of the components of these systems may be implemented on one or more computing devices 200. In certain aspects, a plurality of the components of these systems may be included within one computing device 200. In certain implementations, a component and a storage device may be implemented across several computing devices 200.

The computing device 200 comprises at least one communications interface unit, an input/output controller 210, system memory, and one or more data storage devices. The system memory includes at least one random access memory (RAM 202) and at least one read-only memory (ROM 204). All of these elements are in communication with a central processing unit (CPU 206) to facilitate the operation of the computing device 200. The computing device 200 may be configured in many different ways. For example, the computing device 200 may be a conventional standalone computer or alternatively, the functions of computing device 200 may be distributed across multiple computer systems and architectures. In FIG. 2, the computing device 200 is linked, via network or local network, to other servers or systems.

The computing device 200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 208 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 206 comprises a processor, such as one or more conventional microprocessors and one or more supplementary co-processors such as math co-processors for offloading workload from the CPU 206. The CPU 206 is in communication with the communications interface unit 208 and the input/output controller 210, through which the CPU 206 communicates with other devices such as other servers, user terminals, or devices. The communications interface unit 208 and the input/output controller 210 may include multiple communication channels for simultaneous communication with, for example, other processors, servers or client terminals.

The CPU 206 is also in communication with the data storage device. The data storage device may comprise an appropriate combination of magnetic, optical or semiconductor memory, and may include, for example, RAM 202, ROM 204, flash drive, an optical disc such as a compact disc or a hard disk or drive. The CPU 206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 206 may be connected to the data storage device via the communications interface unit 208. The CPU 206 may be configured to perform one or more particular processing functions.

The data storage device may store, for example, (i) an operating system 212 for the computing device 200; (ii) one or more applications 214 (e.g., computer program code or a computer program product) adapted to direct the CPU 206 in accordance with the systems and methods described here, and particularly in accordance with the processes described in detail with regard to the CPU 206; or (iii) database(s) 216 adapted to store information that may be utilized to store information required by the program.

The operating system 212 and applications 214 may be stored, for example, in a compressed, an uncompiled and an encrypted format, and may include computer program code. The instructions of the program may be read into a main memory of the processor from a computer-readable medium other than the data storage device, such as from the ROM 204 or from the RAM 202. While execution of sequences of instructions in the program causes the CPU 206 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to validating routing policies for a network as described herein. The program also may include program elements such as an operating system 212, a database management system and "device drivers" that allow the processor to interface with computer peripheral devices (e.g., a video display, a keyboard, a computer mouse, etc.) via the input/output controller 210.

The term "computer-readable medium" as used herein refers to any non-transitory medium that provides or participates in providing instructions to the processor of the computing device 200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
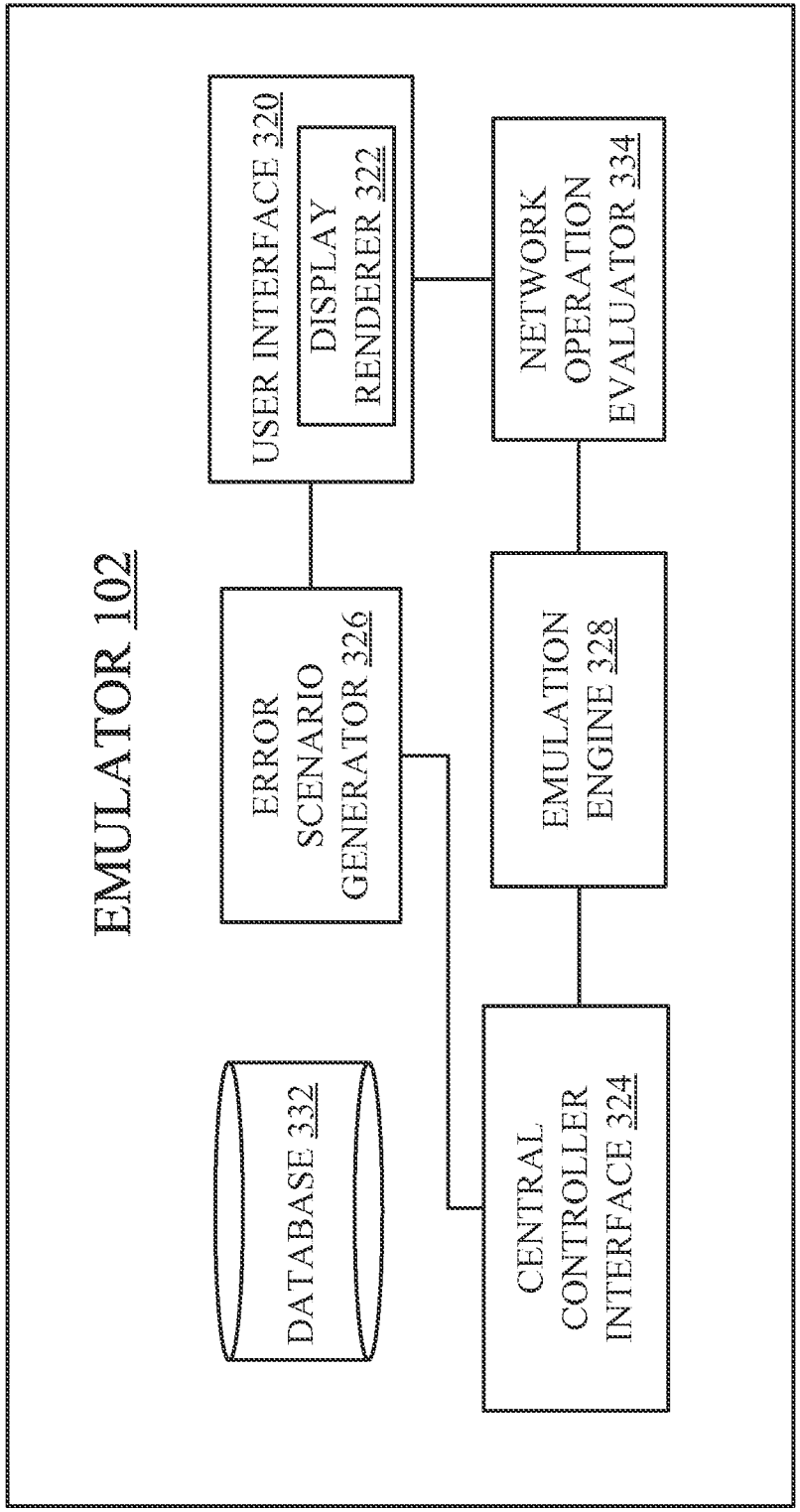
FIG. 3 is a block diagram of an emulator for validating routing policies received by a central controller, according to an illustrative implementation of the disclosure.

The computing device 200 may be used for any of the components in emulator 102. FIG. 3 is a block diagram of emulator 102 for validating routing policies received by central controller 104. Emulator 102 includes several components for interfacing with other devices and data storage and processing. In particular, emulator 102 includes user interface 320, central controller interface 324, error scenario generator 326, emulation engine 328, database 332, and network operation evaluator 334. Emulator 102 provides node states 106 to central controller 104 and receives routing policies 108 from central controller 104. After receiving a set of routing policies 108, emulator 102 validates (or invalidates) the routing policies 108 by checking for problems such as inconsistencies, inefficiencies, or any other undesirable qualities associated with a network. If a problem is identified, emulator 102 may provide an alert to another device, a network administrator, or any other suitable authority.

Emulator 102 communicates with central controller 104 over central controller interface 324. In particular, emulator 102 provides node states 106 to central controller 104 over central controller interface 324. In an example, emulator 102 may generate node states 106 by using error scenario generator 326. Error scenario generator 326 may be configured to parse through a set of error scenarios for testing. As an example, the set of error scenarios may include all possible combinations of nodes in error for a particular network 110. In another example, the set of error scenarios may include all possible combinations of nodes in error when a fixed number of nodes are in error. Thus, for N nodes in a network, the set of error scenarios may include all scenarios in which K nodes are in error, or N choose K scenarios. In general, any suitable set of error scenarios may be used, and as each error scenario is tested, the error scenario may be assigned a label such as validated or invalidated. Error scenario generator 326 may be configured to track which error scenarios have been tested (i.e., validated or invalidated), and determine a next error scenario to provide to central controller 104 via central controller interface 324 for testing. In addition, error scenario generator 326 may generate various combinations of random errors. One or more random errors may be selected from a set of errors and imposed on a node, and these errors may be independently applied to multiple nodes. Error scenario generator 326 may continuously apply random errors to give rise to unforeseen corner error conditions that helps to test the system's resilience under the various error conditions. Error scenario generator 326 may also use database 332 to store invalidated, validated, and/or untested error scenarios. Database 332 may also store any other data related to nodes 111, network 110, such as node states 106, routing policies 108, a network map, or any other suitable data related to emulator 102.

In another example, emulator 102 may receive an error scenario for testing from user interface 320. In particular, a user such as a network administrator may interact with user interface 320 to provide one or more error scenarios for testing. As used herein, "user interface" includes, without limitation, any suitable combination of one or more input devices (e.g., keypads, touch screens, trackballs, voice recognition systems, etc.) and/or one or more output devices (e.g., visual displays, speakers, tactile displays, printing devices, etc.). User interface 320 also includes a display renderer 322 for rendering a display of network characteristics such as those shown in FIGS. 5-7, for example. The user-provided error scenarios for testing are provided (one at a time, for example) to central controller interface 324 for transmission to central controller 104. User interface 320 may provide the user-provided error scenarios to error scenario generator 326, which then provides the error scenarios to central controller interface 324, or user interface 320 may directly provide the error scenarios to central controller interface 324.

After providing an error scenario to central controller 104, emulator 102 receives routing policies 108 from central controller 104 over central controller interface 324. Routing policies 108 are a set of rules dictating how nodes 111 in the network should forward data packets, and are described in more detail in relation to FIG. 1A. Central controller interface 324 provides routing policies 108 to emulation engine 328. In addition, central controller interface 324 may provide the current error scenario to emulation engine 328, or emulation engine 328 may receive the current error scenario from another suitable component, such as error scenario generator 326 or user interface 320.

Emulation engine 328 determines whether the routing policies 108 are valid or invalid. In order to do this, emulation engine 328 may perform a series of tests. In particular, as described in relation to FIG. 1B, emulation engine 328 may perform a combination of local and/or global protocol validation tests. For local protocol validation tests, emulation engine 328 may consider one node at a time and may verify that the routing instructions for the considered node are consistent with the node's current state and the current states of the node's immediate neighbors. In general, local validation tests consider inconsistent routing policies. In addition, emulation engine 328 checks to ensure that the local network operation at the node conforms to the communication protocol defined between the node and central controller 104. In an example of a local validation test, emulation engine 328 determines whether a node has been instructed to insert itself into a path that does not include the node. In another example, emulator 102 may determine whether a node has been instructed to forward data to a node in error or along an unavailable link. In another example of a local validation test, emulator 102 may identify conflicting paths with the same destination. In another example, emulator 102 identifies malformed messages from central controller 104. A malformed message may include some required field that are missing or improperly filled.

In global protocol validation tests, emulation engine 328 checks the state of other nodes in the network to ensure the global functionality of the network. In particular, global validation tests identify situations in which network operation on a global scale may be invalid, even when one or more individual nodes are valid locally. Global validation tests ensure that for all nodes 111 in the network, the nodes' states and routing policies are consistent with one another. In some implementations, global validation tests ensure consistency among nodes 111 in a same network path (i.e., connected by active links). For example, global validation tests are particularly useful for identifying invalid network operations during a transitional phase from one set of routing policies 108 to another. For example, two nodes in the same active network path may have conflicting routing policies (because one of the nodes has not yet been updated with the new routing policy 108, for example), leading to dropped data packets. To perform a global validation test, emulation engine 328 may check the state of every other node in the network, or a subset of the nodes in the network. In an example of a global validation test, emulation engine 328 determines whether a node is instructed to send a data packet through a path when another node in the path is not successfully configured with the same routing policy. In another example, a node should not remove itself from a path when there is still active data traffic traversing the path because data packets will be lost upon removal of a node. In another example, emulation engine 328 may be configured to detect inefficient routing policies, such as those that give rise to looped network paths.

Emulation engine 328 may use any combination of local or global validation tests to validate a set of routing policies 108. In particular, to ensure that these types of error do not occur, emulation engine 328 may iteratively select each node 111 and identify whether the selected node has been given instructions that would cause local and/or global errors. In an example, all tests (including local and global tests, for example) may be performed for a selected node before moving on to another node. In another example, local tests may be performed on multiple nodes before performing global tests. Various components of emulation engine 328 are described in more detail in relation to FIG. 4.

After emulation engine 328 has performed validation tests of a set of routing policies 108, network operation evaluator 334 performs an assessment of the test results. For example, network operation evaluator 334 may assign a grade to the performance of the routing policies 108 in view of the node states 106. In some embodiments, the grade is a binary variable, indicative of whether an invalid network operation was identified. In other embodiments, the grade is a variable indicating a proportion of invalid network operations that were identified relative to those tested. In general, the grade may reflect any suitable metric for assessing the validity of a set of routing policies 108. Network operation evaluator 334 may provide the grade to a user through user interface 320. When the grade indicates that some invalid network operations were identified, the parameters of the emulation may also be provided to the user. Network operation evaluator 334 may be a separate component in emulator 102 as shown in FIG. 3, or network operation evaluator 334 may be included in another component such as emulation engine 328.

Figure 4:
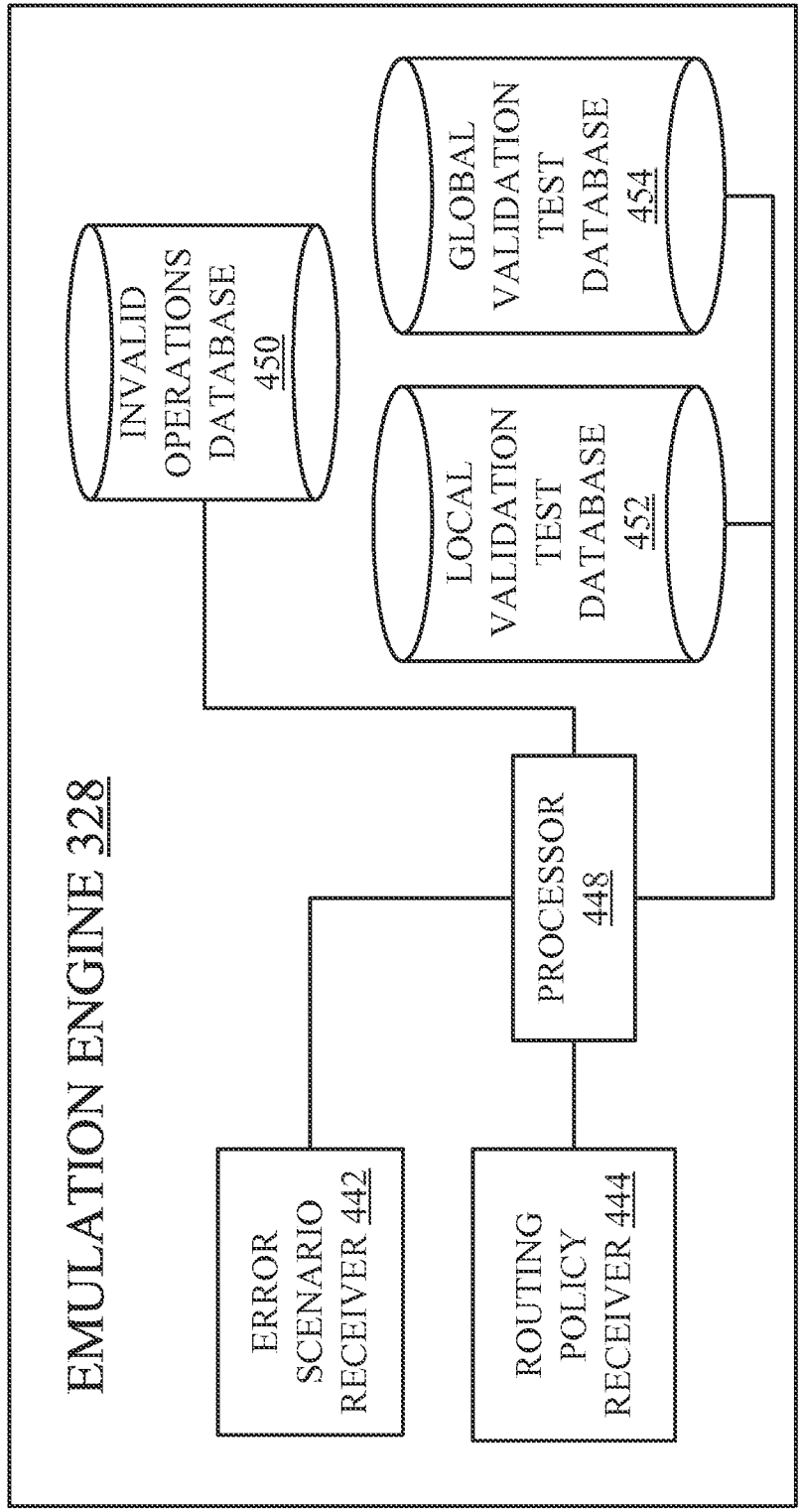
FIG. 4 is a block diagram of an emulation engine for performing validation tests on routing policies received by a central controller, according to an illustrative implementation of the disclosure.

FIG. 4 is a block diagram of an emulation engine 328 for identifying invalid network operations in routing policies 104 received by central controller 104. Emulation engine 328 includes several components for executing the processes described herein. In particular, emulation engine 328 includes an error scenario receiver 442, a routing policy receiver 444, a processor 448, validation test databases 452 and 454, and an invalid operations database 450.

Emulation engine 328 receives an error scenario over error scenario receiver 442. Error scenario receiver 442 may provide an interface with central controller interface 324, which may transmit error scenarios to emulation engine 328. Alternatively, error scenario receiver 442 may be an interface with error scenario generator 326, which may directly transmit error scenarios to emulation engine 328. In particular, the received error scenarios correspond to a combination of network errors, such as a combination of node states 106 or network link errors. The error scenario may be based on a user input (as shown in FIG. 6), may be artificially generated using error scenario generator, or may be based on any other suitable system for selecting an error scenario.

Emulation engine 328 also receives a set of routing policies 108 over routing policy receiver 444, which provides an interface between emulation engine 328 and central controller interface 324. In particular, routing policies 108 are received from central controller 104 and provide instructions indicating how the nodes 111 in network 110 should forward the data packets. For example, a routing policy 108 may include the use of one or more routing tables.

Emulation engine 328 may use one or more storage devices to store which types of validation tests to perform. As shown in FIG. 4, emulation engine 328 locally stores a local validation test database 452 and a global validation test database 454. In some embodiments, the data stored in databases 452 and 454 may be stored together in the same database. In addition, the data in databases 452 and 454 may be stored on a device separate from emulation engine 328, which may retrieve the data as necessary. In particular, database 452 stores a series of local validation tests for verifying that the local network paths dictated by routing policies 108 are consistent with the current state of a particular node 111 and its neighbors. Furthermore, database 454 stores a series of global validation tests for identifying situations in which global network operation is invalid, even when one or more individual nodes are valid locally. Emulation engine 328 uses the validation tests stored on databases 452 and 454 to identify any invalid network operations associated with the received routing policies and the received error scenario.

Emulation engine 328 further includes a processor 448. As used herein, the term "processor" or "computing device" refers to one or more computers, microprocessors, logic devices, servers, or other devices configured with hardware, firmware, and software to carry out one or more of the computerized techniques described herein. Processors and processing devices may also include one or more memory devices for storing inputs, outputs, and data that is currently being processed. An illustrative computing device 200, which may be used to implement any of the processors and servers described herein, is described in detail with reference to FIG. 2. In particular, processor 448 receives the error scenario from error scenario receiver 442, receives the routing policies 108 from routing policy receiver 444, and implements the series of local and global protocol validation tests stored on databases 452 and 454 to identify any resulting invalid network operations. The implementation of these validation tests is described in more detail with reference to FIG. 10. If no such operations are identified, emulation engine 328 may provide a signal indicating that the current set of routing policies 108 is valid for the current error scenario. Alternatively, if one or more invalid operations are identified, these invalid network operations may be stored on invalid operations database 450. The data in database 450 may be provided to a device such as network operation evaluator 334 for assigning an overall grade indicative of the performance of the routing policies in view of the error scenario.

Figure 5A:
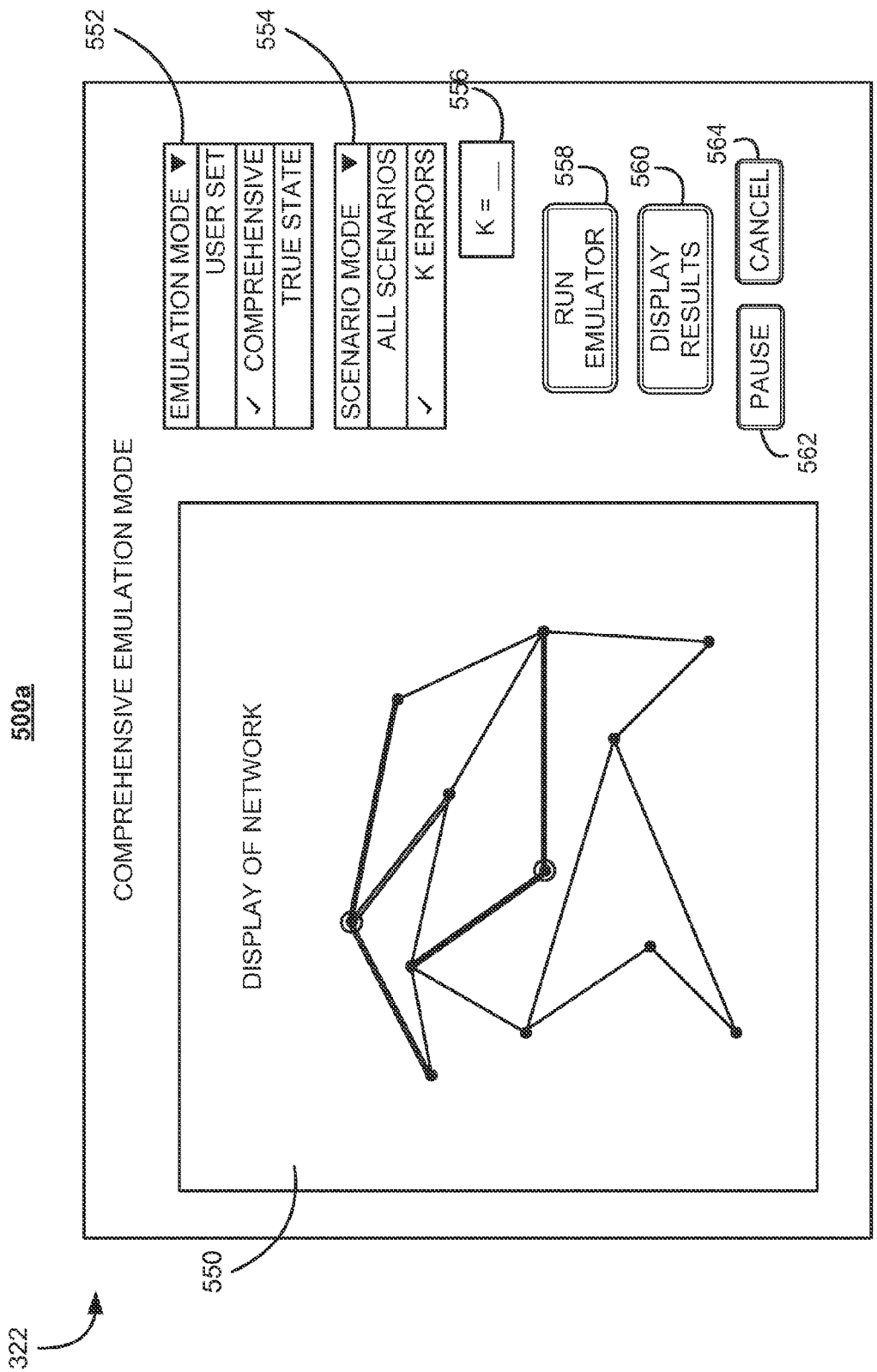
FIGS. 5A-5B are diagrams of exemplary displays of a user interface for running an emulator operating in a comprehensive emulation mode, according to an illustrative implementation of the disclosure.
Figure 5B:
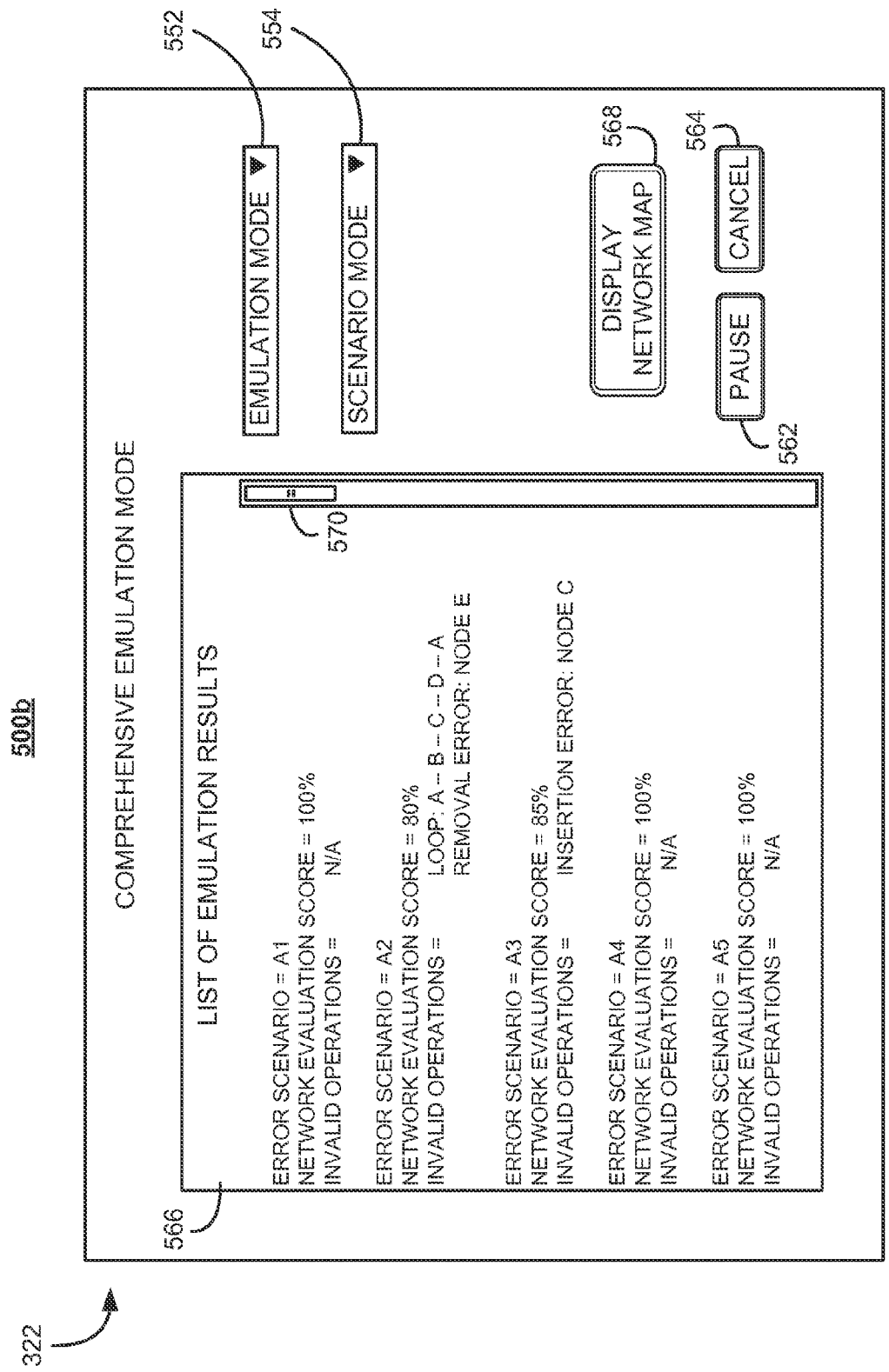

FIGS. 5A-5B are diagrams 500a-500b of exemplary displays of a user interface for a user interacting with emulator 102. In diagrams 500a-500b, a user has selected a "comprehensive" option as the emulation mode 552. In the comprehensive mode, emulator 102 iterates through all possible error scenarios (i.e., combinations of node states 106) for network 110 and performs testing (as described in relation to FIG. 3) on each set of routing policies 108 corresponding to each error scenario.

In particular, diagram 500a shows an example screenshot when the comprehensive mode is selected. The user may select the "all scenarios" option as the scenario mode 554. In the all scenarios mode, emulator 102 considers all possible error scenarios, including all possible combinations of node states in the network. Alternatively, the user may select the "K errors" option as the scenario mode 554. In the K errors mode, emulator 102 considers error scenarios including all possible combinations of node states when a fixed number (K) of nodes are in error. When the K errors mode is selected, the user may enter a desired value for K in box 556. The user may prefer to use the K errors mode when it is undesirable to run the emulation for all possible scenarios, and if the user is only interested in a particular subset of the error scenario.

After the desired options have been set in emulation mode 552 and scenario mode 554, the user selects the run emulator button 558 to begin the emulation. During the emulation, emulator 102 parses through the desired error scenarios, the network display 550 may show a network map or a portion thereof. In particular, while emulator 102 is considering a particular error scenario, those nodes 111 corresponding to error states in the error scenario may be highlighted in real time. For example, as shown in diagram 500a, circles surrounding the node may highlight the error nodes. Alternatively, any other suitable highlight method may be used. In addition, network links connecting a node in error to another node are also highlighted (with double lines, as shown) to depict that no data packets should be sent along those links. While the emulation is running, the user may select pause button 562 or cancel button 564 to appropriately pause or cancel the emulation.

The network display 550 is generally described for when the node states 106 are binary variables, indicative of whether the corresponding node is healthy or in error. However, one of ordinary skill in the art will understand that the node states 106 do not need to be limited to binary values, and any value may be used to reflect a degree of health for a node 111. In an example, the node state 106 may take on a value indicative of a capacity of incoming data that the corresponding node may receive without dropping data packets. In one example, the resulting network display 550 are color coded such that nodes with very small capacities are labeled with one color at one end of a spectrum while healthy nodes are labeled with another color at an opposite end of the spectrum. However, in general, any sort of graphical display for displaying a gradient of node states 106 may be used.

In addition, at any time during the emulation or after the emulation is complete, the user may select "display results" button 560. When button 560 is selected, a list of emulation results is displayed, as shown in diagram 500b, for example. In particular, diagram 500b shows a display of a list 566 of labels for corresponding error scenarios, network evaluation scores, and identified invalid network operations. The user may use scroll bar 570 to view emulation results for various other error scenarios not shown. Optionally, the network map in diagram 500a and list 566 in diagram 500b may be displayed side-by-side, or in separate screens.

Optionally, the user may filter the list to display only those results that resulted in network evaluation scores within a certain range. For example, the user may be interested only in error scenarios in which invalid operations were identified. In this case, only results with corresponding network evaluation scores (i.e., <100%) would be displayed.

As an example, each error scenario may be given a data string label (e.g., "A1") that uniquely identifies the error scenario. The error scenario label may be used in a lookup table to identify the exact nature of the node states 106 in the error scenario. In addition, the list 566 also includes a network evaluation score for each error scenario. The network evaluation score may correspond to the grade provided by network operation evaluator 334, which assesses an overall state of the network accounting for any identified invalid network operations. For example, a network evaluation score of 100% may imply that no invalid network operations were identified for error scenarios A1, A4, and A5.

In another example, error scenario A2 has a network evaluation score of 80%, indicating that one or more invalid network operations were identified. The routing policies 108 provided by central controller 104 resulted in a looped network path and a removal error. For example, when a looped network path is identified, the loop may be identified by using a string of node labels (i.e., loop "A-B-C-D-A" for nodes A, B, C, and D). In addition, error scenario A2 results in a removal error. In particular, a removal error indicates that a corresponding routing policy 108 has instructed a node to remove itself from an active network path, or a network path in which data traffic is still traversing. Because removing a node from an active path would likely lead to a loss of data packets, this is identified as a type of invalid network operation. In addition, list 566 identifies which node (i.e., node E) had the removal error.

In another example, error scenario A3 has a network evaluation score of 85%, indicating that one or more invalid network operations were identified. In particular, the routing policies 108 resulted in an insertion error at node C. An insertion error occurs when a node is instructed by a routing policy to insert itself into a path that does not include the node.

When the list 566 is displayed while the emulation is running, the emulator 102 may continuously update the list 566 as new error scenarios are considered. When emulator 102 has completed the set of tests corresponding to a current error scenario, the list 566 is updated with the current error scenario label, assessed network evaluation scores, and any identified invalid network operations. As an example, the user may set an update mode of the list 566, such that the list is continuously updated as new error scenarios are considered by emulator 102. Alternatively, the user may set the update mode of the list 566 to only update when the user selects a "refresh" button (not shown).

In addition, the data shown in list 566 may also be continuously saved to a database such as database 332 for offline processing. As an example, it would be helpful for a programmer or a network administrator to be able to identify which error scenario gave rise to which invalid network operations. In particular, the programmer may use this information to update the algorithm used by the central controller to generate routing policies 108. The update may give rise to more robust routing policies for the identified error scenarios.

FIG. 6 is a diagram 600 of an exemplary display of a user interface for a user interacting with emulator 102. In diagram 600, a user has selected a "user set" option as the emulation mode 552. In the user set mode, the user provides an example error scenario desired to be used for testing central controller 104.

In an example, the user may select a "single scenario" option as the scenario mode 654. In the single scenario mode, the user selects a single error scenario, and emulator 102 provides validation of the single error scenario. As an example, in the network display 550, the user may select the set error scenario button 657 to indicate that a specific error scenario will be set by the user. After selecting the button 657, the user may select a subset of nodes in the network display 550 (e.g., nodes in error may be highlighted by using circles, as shown) to be in error. When more than two node states are possible (i.e., when the node state indicates a capacity of a node), the user may manually enter values for each node. When the nodes are selected, the links connecting the selected nodes to other nodes may also be highlighted to indicate that those links are inactive. In addition, the user may select a subset of the links in the network to be inactive, even if neither node on the ends of the link is in error (such as link 662). When the user has set the desired error scenario for testing, the user may re-select button 657 to indicate that setting of the error scenario is complete.

After setting the desired error scenario, the user may select button 658 to run the emulator. In this case, emulator 102 transmits the node states 106 corresponding to the user-set error scenario to central controller 104 and performs validation tests on the set of routing policies 108 received from central controller 104. The resulting network evaluation score may be displayed in block 660, and the user may select to view the set of identified invalid network operations, if any, as shown in FIG. 5B, for example.

In another example, the user may be particularly interested in a primary error scenario and its neighboring scenarios, which are error scenarios near the primary error scenario. In this case, the user may select a "run neighbors" option as the scenario mode 654. As an example, the user may be the software programmer who wrote the algorithm used by central controller 104 for configuring routing policies 108. During usual testing of the central controller 104, an error scenario may have been identified as leading to invalid network operations. The user may be particularly interested in error scenarios similar to the identified error scenario, and may select the run neighbors option to test neighboring error scenarios.

In an example, a primary error scenario may differ from its neighboring scenario by no more than a fixed number of errors. For example, a primary error scenario may be modified by removing and/or adding a number of node and/or link errors, and the modified error scenario may qualify as a neighboring scenario if the number of modifications is below a threshold amount. As in the single scenario mode, the user may use button 657 to set a desired error scenario in display 550. The user-set error scenario may correspond to a primary error scenario. In addition, the user provides a value L in box 656. The value L corresponds to the threshold number of error differences between the primary error scenario and its neighboring error scenarios. When emulation is performed in this mode, the primary error scenario and all its neighboring error scenarios are subjected to validation tests.

FIG. 7 is a diagram 700 of an exemplary display of a user interface for a user interacting with emulator 102. In diagram 700, a user has selected a "true state" option as the emulation mode 552. In this case, it may be desirable to validate the routing policies provided by a central controller to a network 110 in real time.

In particular, emulator 102 receives updated node states directly or indirectly from network 110 in real time, and emulator 102 may then provide these node states to a first central controller. In addition, network 110 may be in communication with a second central controller, and the first and second controllers implement identical algorithms. This mode may be used if it is desirable for validation tests to be performed simultaneously in a real system.

In addition, a delay may be configured between the system including the second controller and network 110 and the system including the first controller and emulator 102. For example, changes to the node states 106 (that are controllable, such as taking down routers or switches for scheduled maintenance) may be provided to emulator 102 before the changes are provided to the second central controller. In this case, emulator 102 may first validate the routing policies 108 provided by the first central controller based on the updated set of node states 106. Then, if the routing policies 108 are validated, the network 110 may provide the updated set of node states 106 to the second central controller.

Figure 8:
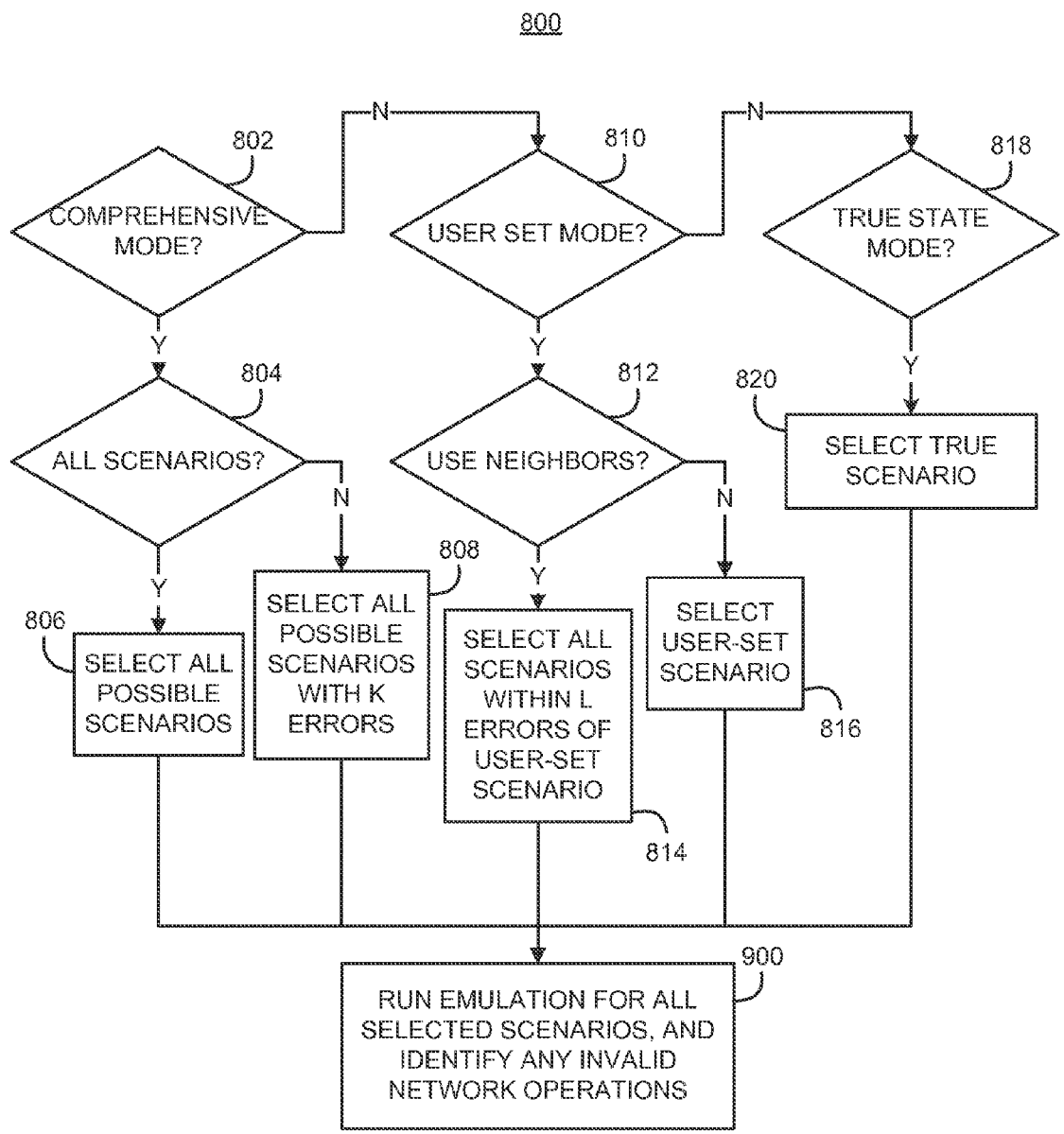
FIG. 8 is a flow diagram depicting a process, on the emulator, for selecting a set of error scenarios and implementing the emulation, according to an illustrative implementation of the disclosure.
Figure 9:
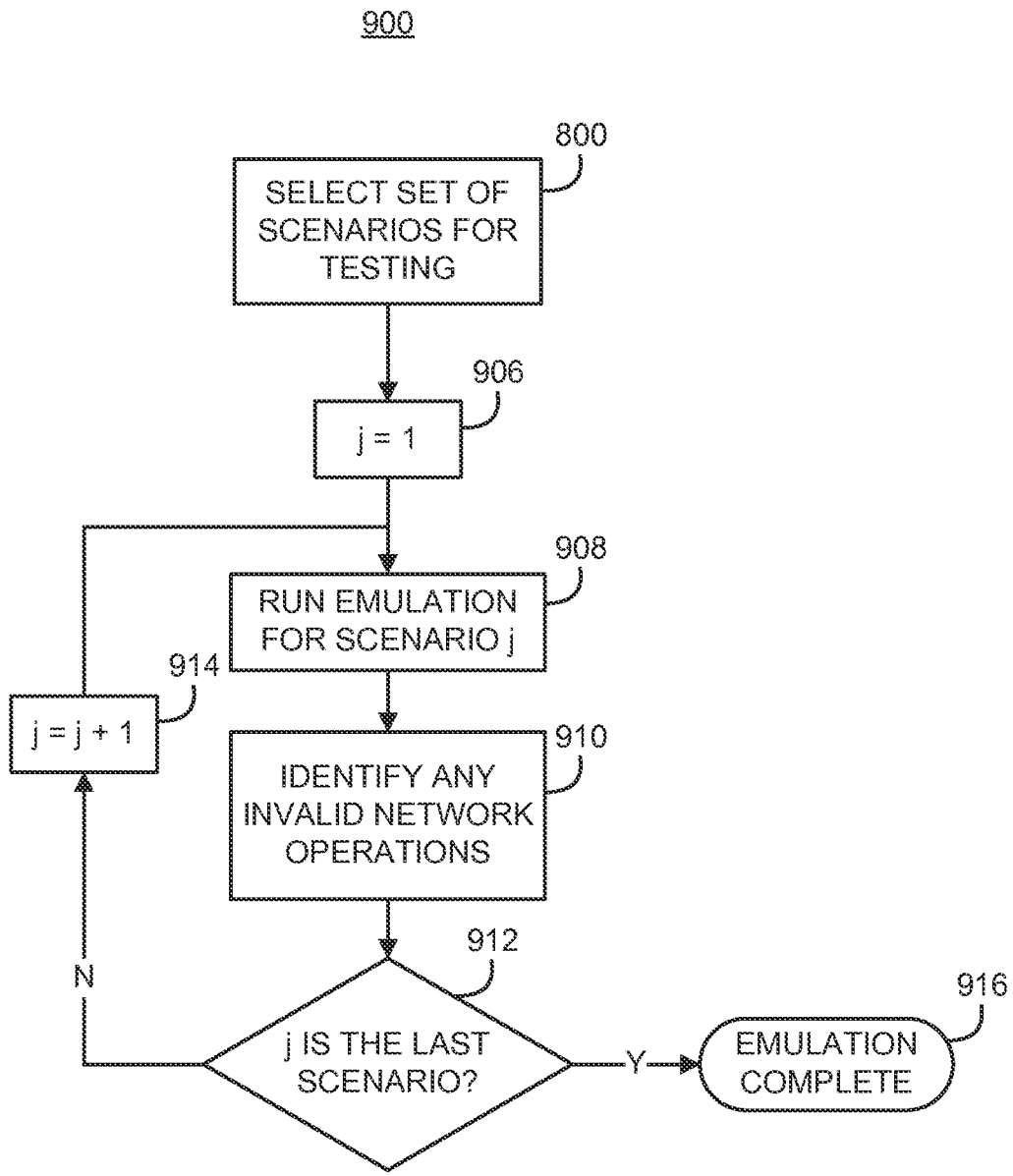
FIG. 9 is a flow diagram depicting a process, on the emulator, for implementing the emulation for multiple error scenarios, according to an illustrative implementation of the disclosure.
Figure 10:
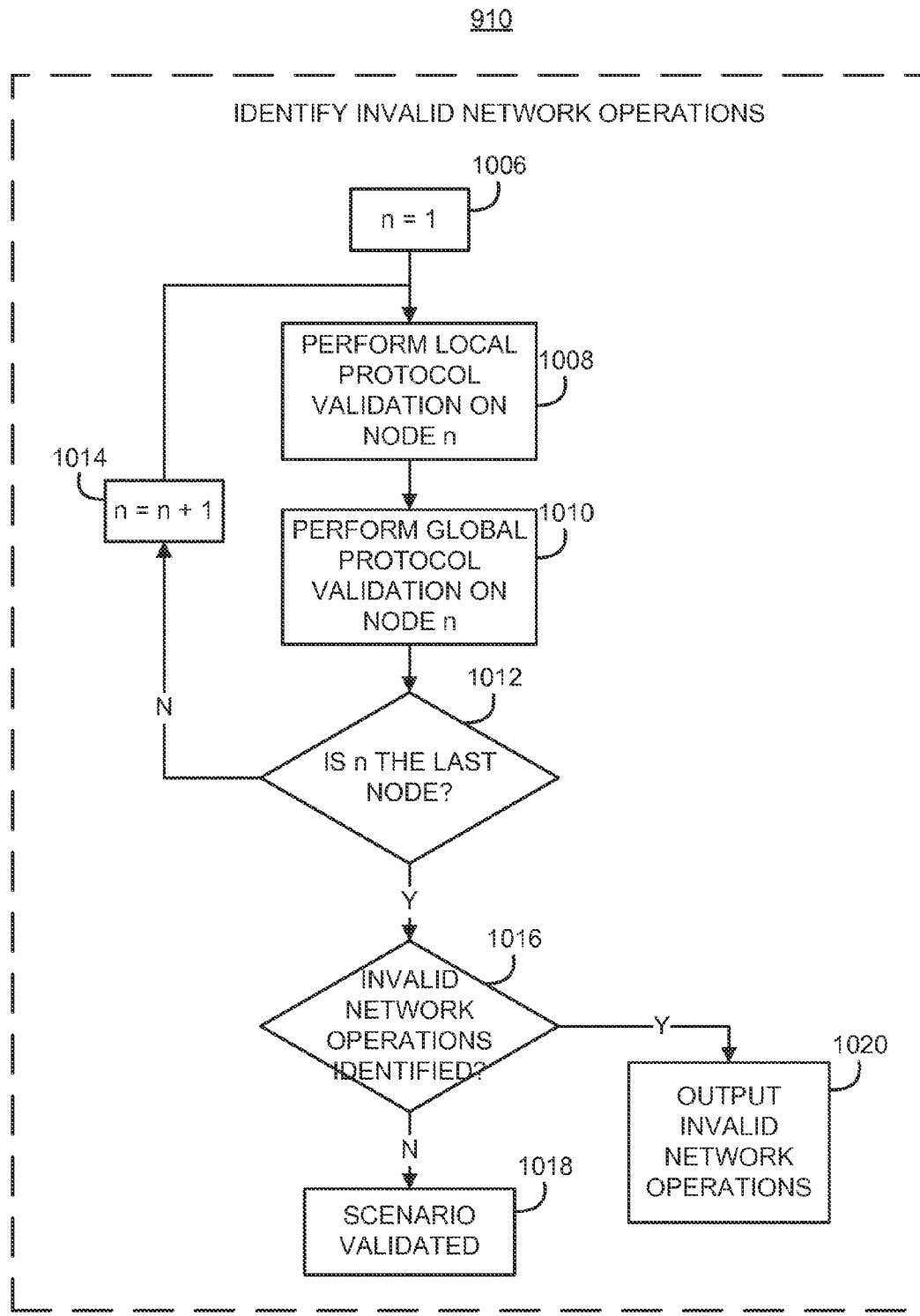
FIG. 10 is a flow diagram depicting a process, on the emulator, for identifying invalid network operations, according to an illustrative implementation of the disclosure.
Figure 11:
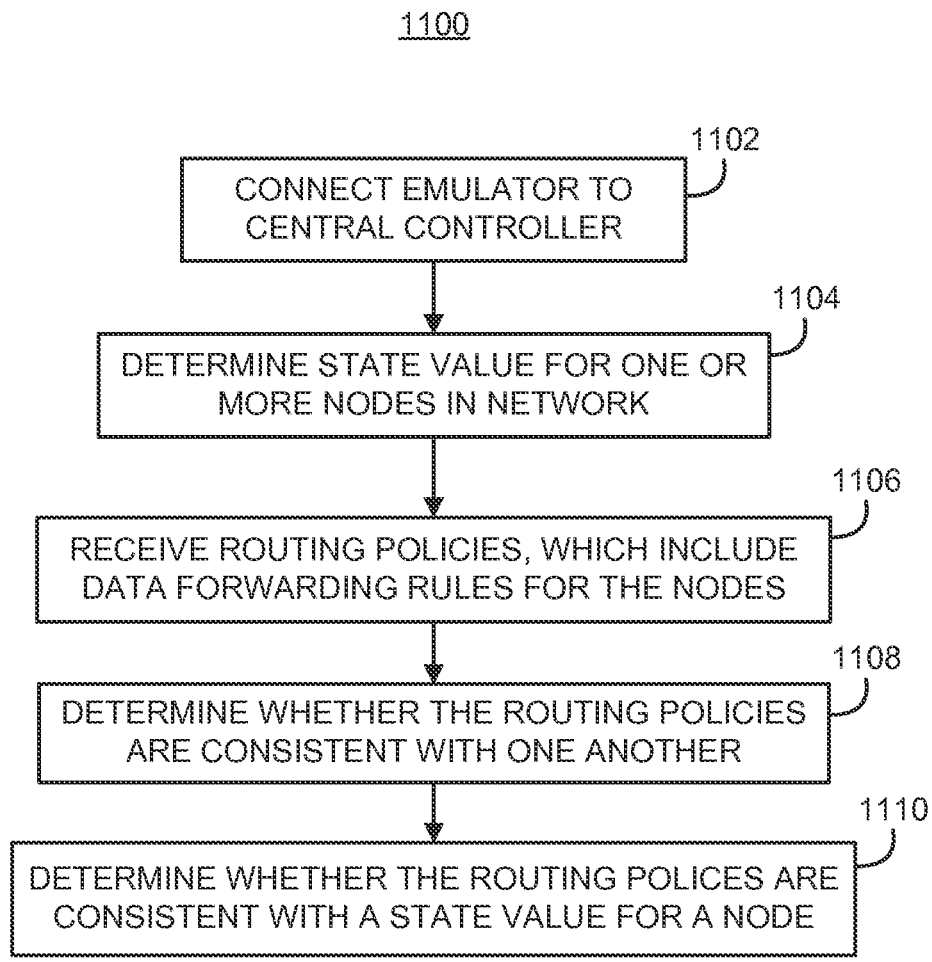
FIG. 11 is a flow diagram depicting a process, on the emulator, for implementing the emulation, according to an illustrative implementation of the disclosure.
Figure 12:
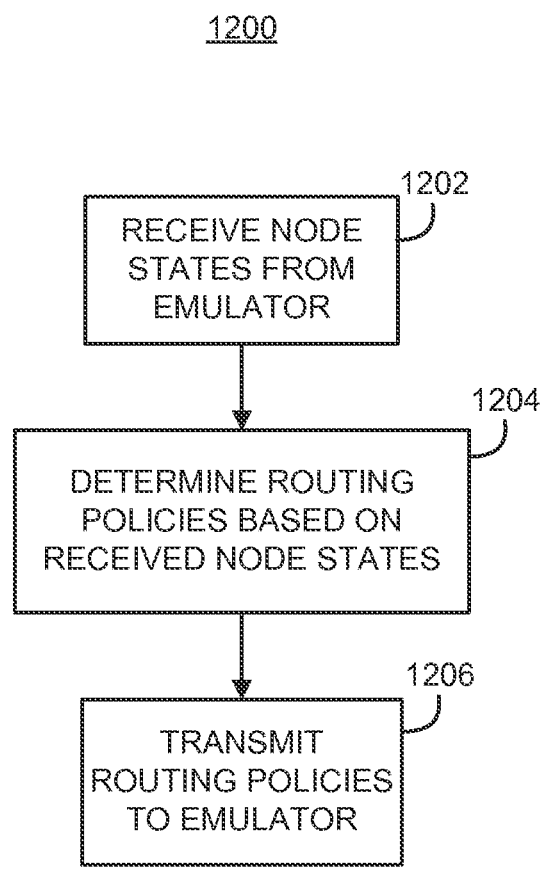
FIG. 12 is a flow diagram depicting a process, on the central controller, for managing a network, according to an illustrative implementation of the disclosure.

FIGS. 8-12 are flow diagrams depicting various processes used by the emulator 102 or by the central controller 104. In particular, FIGS. 8-11 are flow diagrams depicting various processes used by the emulator 102 to emulate the behavior of a network to the central controller 104. In particular, FIG. 8 is a flow diagram depicting a process used by the emulator 102 to identify a mode of operation and to select one or more error scenarios for testing the central controller 104. After the desired error scenarios have been selected, the emulator may execute the steps of FIG. 9 to iteratively perform the emulation for each error scenario in the selected set of error scenarios. For each selected error scenario, the emulator may execute the steps of FIG. 10 to perform validation tests for a set of nodes in the network to identify any invalid network operations. In addition, FIGS. 11 and 12 are high level flow diagrams depicting a process used by the emulator 102 to perform an emulation (FIG. 11), and a process used by the central controller 104 to provide routing policies 108 (FIG. 12).

FIG. 8 is a flow diagram depicting a process 800, on the emulator, for selecting one or more error scenarios for testing. The error scenarios may be randomly or deterministically selected. In particular, process 800 includes the steps of determining whether the user has selected a comprehensive mode (decision block 802), a user set mode (decision block 810), or a true state mode (decision block 818). Based on the selected mode, one or more error scenarios are selected.

At decision block 802, emulator 102 determines whether the user has selected a comprehensive mode, such as shown in FIGS. 5A-5B. If the user has selected a comprehensive mode, the process proceeds to decision block 804, where emulator 102 determines whether the user has selected an all scenarios option as the scenario mode (see FIG. 5A, for example). If the all scenarios option is selected, at step 806, emulator 102 selects all possible error scenarios associated with the network. In particular, all possible error scenarios may include every combination of node and/or link states for each node in the network. Otherwise, if the all scenarios option is not selected, the user may have selected the K errors scenario (see FIG. 5A, for example). At step 808, emulator 102 selects all possible error scenarios with a fixed number (K) of errors. The number K may correspond to a number of node states in error, a number of link states in error, a combination of both, or any other number suitable for expressing an amount of errors in a network.

If emulator 102 determines that the comprehensive mode has not been selected, at decision block 810, emulator 102 determines whether a user set mode has been selected. If so, the process proceeds to decision block 812, where emulator 102 determines whether to include neighboring errors scenarios in the selected set of error scenarios for testing. If emulator 102 determines that the user has selected the run neighbors scenario mode (see FIG. 6), emulator 102 selects a user set primary error scenario and all neighboring scenarios within a number (L) errors of the primary error scenario at step 814. Otherwise, emulator 102 selects the single user set primary error scenario for testing at step 816.

If emulator determines that the user set mode has not been selected, the process proceeds to decision block 818, where emulator 102 determines whether a true state mode has been selected. If so, at step 820, emulator 102 selects a true error scenario, which may correspond to a current error scenario of a real network.

After one or more error scenarios have been selected, the process proceeds to step 900 to perform the emulation for all the selected error scenarios, and any invalid network operations corresponding to the selected error scenarios are identified. The process at step 900 is described in more detail in relation to FIG. 9.

FIG. 9 is a flow diagram depicting a process 900, on the emulator 102, for performing the emulation and identifying any invalid network operations. In particular, process 900 includes the steps of selecting a set of error scenarios for testing (step 800, described in detail in relation to FIG. 8), initializing an iteration parameter (step 906), implementing the emulation for a scenario (step 908), and identifying any invalid network operations associated with the scenario (step 910). Then, emulator 102 determines whether the last scenario has been considered (decision block 912), and if not, the iteration parameter is incremented (step 914), and the process returns to step 908 to run the emulation for the corresponding scenario.

After the set of scenarios for testing have been selected at step 800, an iteration parameter j is initialized to one at step 906. The iteration parameter j corresponds to an error scenario to be emulated. At step 908, emulator 102 performs emulation for the error scenario j. In particular, performing emulation for an error scenario may include transmitting the corresponding node states 106 to central controller 104 and receiving routing policies 108 configured based on the node states 106.

At step 910, invalid network operations may be identified as a result of performing multiple tests on the received routing policies to check for inconsistencies or inefficiencies in the routing policies. In particular, each node in the network may be iteratively selected and subjected to sets of local and global protocol validation tests. A detailed flow diagram depicting this process is shown in FIG. 10.

After completion of emulation and validation (or invalidation) of each scenario j, the process proceeds to decision block 912 to determine whether the error scenario j is the last error scenario to be tested. If not, the iteration parameter j is incremented at step 914, and the process returns to step 908 to run the emulation for scenario j. Otherwise, the process proceeds to step 916, and emulation of the selected set of error scenarios is complete.

FIG. 10 is a flow diagram depicting a process 910, on the emulator, for identifying invalid network operations for a particular error scenario. In particular, process 910 includes the steps of initializing an iteration parameter (step 1006), performing local protocol validation tests on a node (step 1008), performing global protocol validation tests on the node (step 1010), and determining whether all the nodes in the network have been considered (step 1012). If not, the iteration parameter is incremented (step 1014), and protocol validation tests are performed on the next node (steps 1008 and 1010). When all nodes have been considered, if no invalid network operations have been identified, the error scenario is validated (step 1018). Otherwise, the identified invalid network operations are provided as output (step 1020).

At step 1006, an iteration parameter n is initialized to one. In particular, the iteration parameter n corresponds to a node to be tested under protocol validation tests. At step 1008, local protocol validation tests are performed on node n. Examples of local protocol validation tests have been described in relation to FIG. 1B. Local protocol validation tests verify that the local network paths dictated by routing policies 108 are consistent with the current state of a node and its neighbors. As an example of a local protocol validation test, emulator 102 may determine whether node n would be instructed (by the received routing policies 108) to insert itself into a path that does not include node n. In another example of a local protocol validation test, network paths including node n may be examined for any loops. Routing policies 108 that form loops in network paths are inefficient and are problematic because data packets could potentially travel endlessly in a loop. Any invalid local network operations (i.e., insertion error or network loops) may be identified and stored to database 332 for offline processing.

In an example, a local validation test may include determining whether loops exist in a network path. To perform this test, emulator 102 may inspect the routing table of node n and the routing tables of node n's neighbors for any inconsistencies. An inconsistency may include node n's routing table instructing node n to transmit a data packet to another node (i.e., node m), while node m's routing table instructs node m to transmit the same data packet to node n. In another example, emulator 102 is configured to validate the routing policies 108 with the set of node state values 106. In particular, a state value for a node may be a flag variable (i.e., 1 if the node is healthy, and 0 if the node is in error). To validate the routing policies 108 with the set of binary node states, the emulator 102 may inspect the routing table of node n and ensure that the routing table is consistent with states of node n and node n's neighbors. For example, if the routing table instructs node n to transmit data to a neighboring node (i.e., node m), emulator 102 identifies an invalid network operation if node m's state is 0. One of ordinary skill in the art will understand that the examples described herein are for illustrative purposes only, and that in general, any form of local validation tests may be performed to verify that the routing policies 108 are consistent with one another and with the node states 106.

In some implementations, a set of local validation tests may be stored on local validation test database 452 in emulation engine 328. In another example, the local validation tests may be stored in a computer program. At step 1008, emulation engine 328 may retrieve a first local validation test from the database 452 and perform the first local validation test on node n. After the results (i.e., validation or invalidation) are stored, emulation engine 328 may retrieve a second local validation test from the database 452 and perform the second local validation test on node n. This may be repeated until results have been obtained for all desired local validation tests. In particular, step 1008 includes an inner iteration loop (for iterating over the validation tests), while steps 1008, 1010, 1012, and 1014 form an outer iteration loop (for iterating over the nodes). In another example, an outer loop forms iterations over local validation tests, and an inner loop forms iterations over the nodes. In general, any suitable form of implementing the local validation tests on a set of nodes may be used.

At step 1010, global protocol validation tests are performed on node n. Examples of global protocol validation tests have been described in relation to FIG. 1B. In particular, global tests involve validating a state of every other node in the network (other than node n) to ensure the overall system does not have invalid network operations even when the node n passes all local protocol validation tests. Global protocol validation tests verify that the state and routing policies of nodes in the same active network paths are consistent with one another. In particular, global validation tests may be performed during transitional phases, when one set of routing policies changes to another set of routing policies. During a transition, one node in a network path may be operating under one set of routing policies 108, while another node in the same network path may have a different sent of routing policies 108. This could mean that the same network path with active data traffic has conflicting routing policies 108, leading to a loss of data packets. As an example, emulator 102 may determine whether node n would be instructed to send a data packet through a path when another node in the path is not successfully configured with the same routing policy. Furthermore, routing policies should not cause a loss of data packets. In another example of a global test, node n should not be instructed to remove itself from a path when there is still active data traffic traversing the path because data packets will be lost upon removal of the node n. Any invalid global network operation (i.e., inconsistent policies or removal error) may be identified and stored to database 332 for offline processing.

Figure 13:
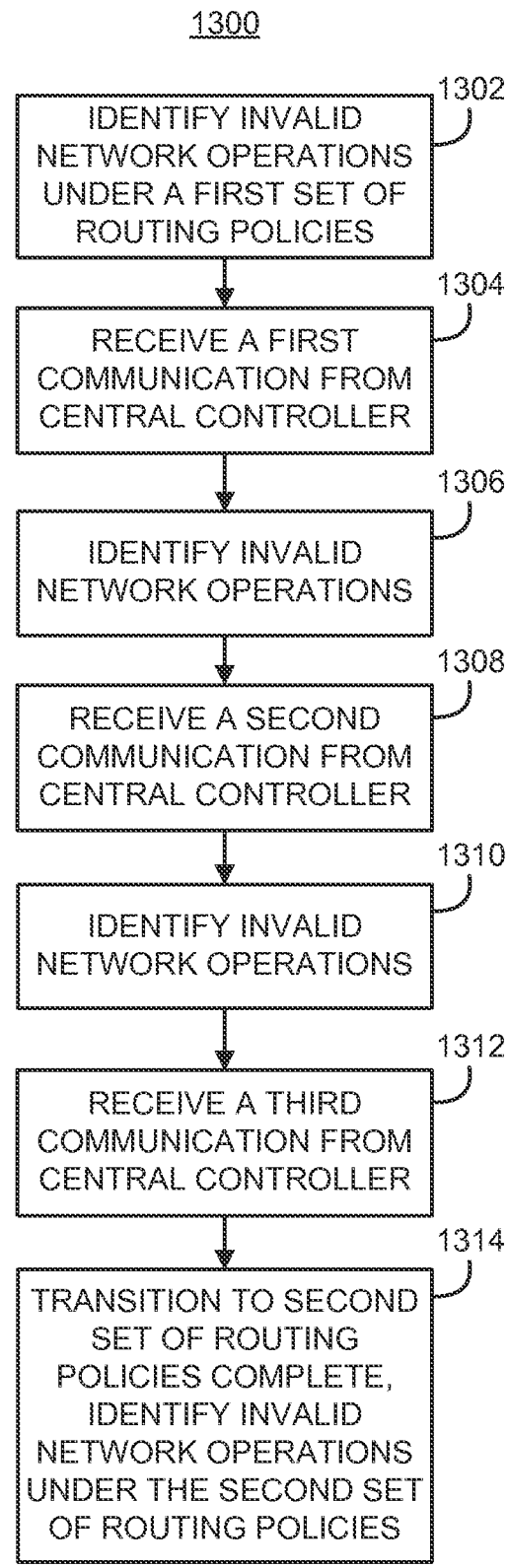
FIG. 13 is a flow diagram depicting a process, on the emulator, for implementing the emulation during a transitional period, according to an illustrative implementation of the disclosure.
Figure 14:
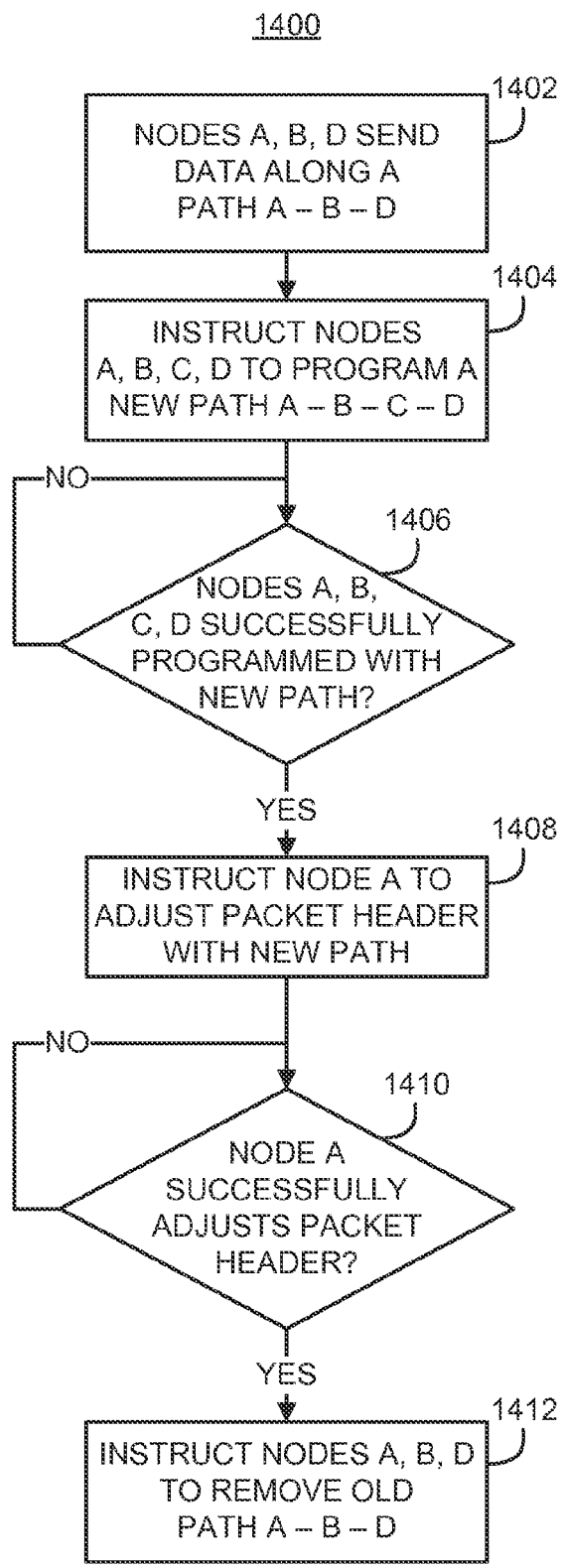
FIG. 14 is a flow diagram depicting a process, on the central controller, for transitioning from one set of routing policies to another set of routing policies, according to an illustrative implementation of the disclosure.

In an example, a global validation test may include determining whether two sets of routing policies (i.e., a first set and a second set) are consistent with one another during a transitional phase from the first set of routing policies to the second set. To perform this test, emulator 102 performs a combination of local and global validation tests for each discrete communication from central controller 104. In particular, to transition from a first set of routing policies to a second set of routing policies, central controller 104 may transmit the new protocol in multiple steps, or in multiple discrete communications. The transition period may take several seconds, several minutes, or any other time interval, and emulator 102 runs local and global validation tests for each step to ensure that data packets are not lost and to verify network consistency during this transitional period. Example implementations of these validation tests during the transitional period are shown in FIGS. 13 and 14.

In an example, emulator 102 compares the routing tables of different nodes to identify any inconsistencies. For example, an inconsistency may include an instruction to node n to transmit data to node m, with the expectation that node m would forward the data along a desired network path. However, node m may be configured with a routing policy that does not include the desired network path, and instead may forward the data along a different network path. One of ordinary skill in the art will understand that the examples described herein are for illustrative purposes only, and that in general, any form of global validation tests may be performed to verify that the routing policies 108 are consistent with one another and with the node states 106.

In some implementations, a set of global validation tests may be stored on global validation test database 454 in emulation engine 328. In another example, the global validation tests may be stored in a computer program. At step 1010, emulation engine 328 may retrieve a first global validation test from the database 454 and perform the first global validation test on node n. After the results (i.e., validation or invalidation) are stored, emulation engine 328 may retrieve a second global validation test from the database 454 and perform the second global validation test on node n. This may be repeated until results have been obtained for all desired global validation tests. In particular, step 1010 includes an inner iteration loop (for iterating over the validation tests), while steps 1008, 1010, 1012, and 1014 form an outer iteration loop (for iterating over the nodes). In another example, an outer loop forms iterations over global validation tests, and an inner loop forms iterations over the nodes. In general, any suitable form of implementing the global validation tests on a set of nodes may be used.

After the local and global protocol validation tests are performed, the process proceeds to decision block 1012, where it is determined whether node n is the last node in the network for consideration. If node n is not the last node, the iteration parameter n is incremented at step 1014, and local and global protocol validation tests are repeated for the next node (steps 1008 and 1010).

When all nodes have been tested, emulator 102 determines whether any invalid network operations have been identified at decision block 1016. If no such operations have been identified, the current error scenario is validated at step 1018 (by assigning a network evaluation score of 100%, for example). In contrast, if at least one invalid network operation has been identified, an appropriate network evaluation score may be assigned, and the invalid network operations may be provided as an output to a user interface 320 or stored in database 332.

FIG. 11 is a flow diagram depicting a process 1100, on the emulator, for performing a portion of an emulation of a network. In particular, emulator 102 may use process 1100 to emulate the activity of a network 110 to central controller 104 and to identify an invalid network operation associated with the provided routing policies 108. Process 1100 includes the steps of connecting emulator 102 to central controller 104

(step 1102), determining a state value for one or more network nodes (step 1104), and receiving routing policies including data forwarding rules for the nodes (step 1106). Process 1100 further includes determining whether the routing policies are consistent with one another (step 1108) and determining whether the routing policies are consistent with a state value for a node (step 1110).

At step 1102, emulator 102 is connected to central controller 104. In particular, it may be desirable to perform validation tests on the routing policies provided by the central controller 104 prior to connecting the central controller 104 to a real network 110. The emulator 102 is configured to represent itself as network 110 to central controller 104, but also performs validation tests on the routing policies and identifies any resulting invalid network operations.

At step 1104, emulator 102 determines state values for one or more nodes in the network. One set of node states 106 corresponds to an error scenario, for which validation testing is desirable. Node states 106 may be based on some user input. For example, a user may indicate that emulator 102 should perform emulation of a single error scenario and/or its neighboring error scenarios (see FIG. 6). In another example, a user may indicate that emulator 102 should perform emulation of all possible error scenarios (see FIG. 5A). In general, an error scenario may be selected, and the node states 106 corresponding to the selected error scenario may be determined.

At step 1106, emulator 102 receives routing policies 108. Routing policies 108 include a set of data forwarding rules for nodes 111 to forward data packets. In particular, routing policies 108 may be received from central controller 104, which configures the routing policies 108 based on the set of determined node state values at step 1104.

At step 1108, emulator 102 determines whether the routing policies are consistent with one another. In particular, emulator 102 identifies any inconsistent routing policies, which give conflicting data forwarding instructions to one or more nodes in the network. In an example, one routing policy may instruct a set of nodes in a network path to forward data to one another. The network path may exclude a first node, and another routing policy may instruct the first node to insert itself into the network path. In this case, the first node's routing instructions conflict with the other nodes' routing instructions. In another example, the routing policies may form network loops, meaning that a first node may be instructed to forward a data packet to another node, only to have the same data packet returned to the first node at a later time. In this case, the routing policies 108 cause inefficiencies in the form of network loops.

In addition, inconsistent routing policies may be identified during a transition from a first set of routing policies to a second set of routing policies. In particular, during this transition, the first and second sets of routing policies may be inconsistent with each other. As an example, a first node may be associated with the first set of routing policies, and a second node may be associated with the second set of routing policies. The first and second nodes may share a network path that is included in at least one of the first or second set of routing policies. In other words, either first or second set of routing policies dictates that some data should traverse the shared network path. In an example, when the first set of routing policies includes the network path, and the second set of routing policies omits the network path, inconsistent policies during transition arise when the first node is instructed to send traffic through the network path because the second node is not configured with the network path. In another example, when the first set of routing policies omits the network path, and the second set of routing polices include the network path, inconsistent policies during transition arise when the first node is instructed to remove itself from the network path because the second node may still be actively transmitting data to the first node during the transition.

At step 1110, emulator 102 determines whether the routing policies are consistent with a state value for a node. In particular, emulator 102 identifies any routing policies that conflict with a state value of a node. For example, a node may be instructed to forward data to a node in error. In another example, a node in error may be instructed to receive or transmit data. In these cases, data packets will be lost.

At steps 1108 and/or 1110, emulator 102 may perform any combination of local and global protocol validation tests to verify that the functionality of network 110 is operational for a set of routing policies 108. In addition, emulator 102 tests for validation of network operation during transitional phases between different sets of routing policies 108. Examples of local and global protocol validation tests have been described in detail in relation to FIG. 1B, and various ways of implementing these tests have been described in detail in relation to FIG. 10.

FIG. 12 is a flow diagram depicting a process 1200, on the central controller 104, for providing routing policies to a network. In particular, process 1200 includes the steps of receiving node states 106 from emulator 102 (step 1202), determining routing policies 108 based on the received node states 106 (step 1204), and transmitting routing policies 108 to emulator 102 (step 1206).

At step 1202, central controller 104 receives a set of node states 106 from emulator 102. Central controller 104 behaves as if emulator 102 is a network 110 with nodes 111. Central controller may include several components, such as a network interface unit for receiving the node states 106 from network 110 or emulator 102. Node state 106 is indicative of a health status of node 111, and may be a binary variable (i.e., to indicate that node 111 is healthy or in error), or may be indicative of additional information, such as the node's capacity.

At step 1204, central controller 104 determines routing policies 108 based on the received node states 106. In particular, central controller 104 executes an algorithm that receives node states 106 as input and provides routing policies 108. It is desirable for the provided routing policies 108 to take into account node information on a local and global level to provide optimal data flow through network 110. For example, the node state 106 of a node 111 may indicate that the node is in error or has low capacity. Thus, central controller 104 should configure routing policies 108 that direct minimal or no data traffic through the unhealthy node.

At step 1206, central controller 104 transmits routing policies 108 to emulator 102. Central controller 104 may use a network interface unit for transmitting routing policies 108 to emulator 102. In particular, it may only be possible to transmit the routing policies 108 in multiple discrete stages. As described in relation to FIG. 1B, transmitting the routing policies 108 in this manner could potentially give rise to errors while the network transitions from one set of routing policies to another. It is desirable to have a mechanism for testing for these errors during the transitional period and to validate the routing policies 108 provided by central controller 104. Thus, the systems and methods described herein provide a robust mechanism for testing the routing policies 108 by using an emulator 102 to provide hypothetical error scenarios to central controller 104 and validate the received routing policies 108.

FIG. 13 is a flow diagram depicting a process 1300, on the emulator 102, for running validation tests during a transition between two sets of routing policies. In particular, to transition from one set of routing policies to another set, central controller 104 may execute a multi-step protocol. During any one of the multiple steps in the transition protocol, any number of various error conditions may occur (e.g., transient remote procedure call errors, node failures, etc.). Therefore, emulator 102 executes local and global validation tests at each step of the transition phase, or at each discrete communication from central controller 104.

In particular, process 1300 includes the steps of operating under a first set of routing policies and identifying any invalid network operations under the first set (step 1302), receiving a first communication from the central controller (step 1304), and identifying any invalid network operations (step 1306). Process 1300 further includes the steps of receiving a second and third communication from the central controller (steps 1308 and 1312 respectively) and identifying any invalid network operations (steps 1310 and 1314) after each communication. After the third communication, the transition to a second set of routing policies is complete, and any invalid network operations under the second set are identified (step 1314).

At step 1302, emulator 102 identifies any invalid network operations under a first set of routing policies. In particular, emulator 102 may parse through any or all of the steps described in methods 800-1000 to perform an emulation of network operation under the first set of routing policies to identify any invalid network operations. Emulator 102 may perform any combination of local and global validation tests at step 1302.

At step 1304, emulator 102 receives a first communication from central controller 104. The first communication may be stored in database 332 or in any other storage component accessible by emulator 102. The first communication may be indicative of a transition from the first set of routing policies to a second set of routing policies. In particular, the transition may include a multi-step protocol, such that the transition takes place over multiple discrete communications from central controller 104. As an example, the first communication may include a set of transition instructions. In particular, the transition instructions may include instructions to operate under an intermediate set of routing policies during the transition from the first set to the second set of routing policies. These transition instructions may be directed towards a subset or all of the nodes 111. In addition, the first communication may include data indicative of a number of steps over which the transition will take place.

After receiving the first communication, emulator 102 identifies any invalid network operations at step 1306. In particular, emulator 102 may parse through any or all of the steps described in methods 800-1000 to perform an emulation of network operation under the first set of routing policies and the first communication to identify any invalid network operations.

At step 1308, emulator 102 receives a second communication from central controller 104. Similar to the first communication, the second communication may be indicative of a transition from the first set of routing policies to a second set of routing policies. As described in step 1304, the second communication may include a set of transition instructions. After receiving the second communication, emulator 102 identifies any invalid network operations at step 1310 by performing any or all of the steps described in methods 800-1000.

At step 1312, emulator 102 receives a third communication from central controller 104. Similar to the first and second communications, the third communication may be indicative of a transition from the first set of routing policies to a second set of routing policies. As described in step 1304, the third communication may include a set of transition instructions. The third communication may also include data indicative that the third communication is the last communication concerning the transition to the second set of routing policies. After receiving the third communication, the transition from the first to the second set of routing policies is complete, and emulator 102 identifies any invalid network operations at step 1314 by performing any or all of the steps described in methods 800-1000.

As depicted in FIG. 13, the transition from a first set of routing policies to a second set of routing policies takes place in three discrete communications from central controller 104. In general, any number of discrete communications may be used, and the process of identifying any invalid network operations may be used after any or all of the discrete communications.

FIG. 14 is a flow diagram depicting a process 1400, on the central controller, for transitioning from one set of routing policies to another set of routing policies. In particular, process 1400 is one illustrative example protocol that central controller 104 uses to transition from an initial routing policy to a new routing policy. Generally, one of ordinary skill in the art will understand that any number of transition protocols may be used by central controller 104. In particular, the initial routing policy includes a network path across three nodes— A, B, and D. In the initial routing policy, data packets are forwarded from node A to node B, which forwards the data to node D. The new routing policy includes a new network path to include another node in the path. Specifically, data packets are forwarded from node A to node B, which forwards the data to node C, which forwards the data to node D. Protocols for transitioning between two routing policies are important for ensuring that data packets are not lost during the transitional period, and process 1400 includes several discrete operations from central controller 1400 to network 110 or emulator 102. Emulator 102 performs global and local validation tests for each discrete operation in order to verify consistency in the network during the transitional phase.

Process 1400 includes the steps of operating under a first routing policy that includes an initial network path along nodes A, B, and D (step 1402). Then, central controller 104 instructs nodes A, B, C, and D to program a new path along nodes A, B, C, and D (step 1404). After these nodes are successfully programmed with the new path (decision block 1406), central controller 104 instructs node A to adjust the packet header with the new path (step 1408). After the packet header is successfully adjusted (decision block 1410), central controller 104 instructs nodes A, B, and D to remove the initial network path (step 1412).

At step 1402, central controller 104 has instructed nodes A, B, and D to send data along an initial network path. In particular, the initial network path begins at an endpoint node A and terminates at an endpoint node D. The initial network path further includes an intermediate node B, such that node A forwards data packets to node B, which forwards the data packets to node D.

At step 1404, central controller 104 has determined that an updated routing policy is appropriate and instructs nodes A, B, C, and D to program a new network path. In particular, central controller 104 simply sends instructions to the individual nodes A, B, C, and D regarding the new network path. The new network path includes a second intermediate node C, such that data is forwarded from node A to node B, which forwards the data to node C, which finally forwards the data to node D. At step 1404, the new network path has only been programmed into the nodes and is not used, such that the nodes still operate with the initial network path.

At decision block 1406, central controller 104 determines whether the nodes A, B, C, and D are successfully programmed with the new network path. In particular, if a node is unsuccessfully programmed with the new network path, the unsuccessful node may have a transient error. Central controller 104 may then be notified of this transient error and wait until the nodes are successfully programmed with the new network path before proceeding to step 1408. As an example, a transient error may occur if a node is temporarily unable to program the new network path. In some implementations, if an error occurs, central controller 104 may re-send the instructions sent at step 1404, or central controller 104 may simply wait until all the nodes are successfully programmed. Central controller 104 may determine whether to re-send instructions or wait based on the nature of the error.

At step 1408, nodes A, B, C, and D are each successfully programmed with the new network path, and central controller 104 instructs the endpoint node A to adjust the data packet header with the new path. In particular, the data packet header is one way that the nodes determine to which node to forward a data packet. By instructing endpoint node A to adjust the data packet header with the new path, central controller 104 ensures that subsequent nodes (i.e., nodes B and C) forward the data packet according to the new path. The packet header is one example tool that nodes use to forward data packets. In general, central controller 104 may instruct the nodes to adjust any suitable tool that nodes use to forward data packets.

At decision block 1410, central controller 104 determines whether the node A has successfully adjusted the packet header. Central controller 104 may be notified if any errors occur before proceeding to step 1412. In some implementations, if an error occurs, central controller 104 may re-send the instruction to node A to adjust the packet header, or central controller 104 may simply wait for node A to successfully adjust the packet header.

At step 1412, central controller 104 instructs nodes A, B, and D to remove the initial network path. In particular, nodes A, B, and D are instructed to remove the network path from node A to node B to node D from the routing tables, for example.

Process 1400 is an illustrative example of a method for central controller 104 to successfully transition from an initial routing policy (i.e., from node A to node B to node D) to a new routing policy (i.e., from node A to node B to node C to node D). In particular, process 1400 includes at least two ways for emulator 102 to identify errors during the transitional phase. When central controller 104 is in communication with emulator 102, emulator 102 may perform a combination of local and global validation tests for each discrete communication received from central controller 104 to identify any errors.

As an example, if central controller 104 had proceeded directly from step 1404 to step 1408 without determining whether the nodes are successfully programmed with the new path, an error may occur. Specifically, one or more nodes may not be successfully programmed with the new path when the packet header is adjusted. In this case, emulator 102 would perform validation tests after receiving the instructions at step 1404 and would identify any errors resulting from the received instructions. For example, emulator 102 may identify transient errors at one or more particular nodes as a result of the instructions. An example of emulator 102 identifying an error is described in relation to FIG. 15A-15E.

FIG. 15A is a flow diagram depicting an example process 1500, on the emulator, for identifying an error during a transition from one set of routing policies to another set of routing policies. In particular, steps 1504 and 1508 in process 1500 correspond to steps 1404 and 1408, respectively, of process 1400, but from the perspective of emulator 102. At step 1504, emulator 102 receives instructions from central controller 104 instructing nodes A, B, C, and D to program a new path. At step 1508, emulator 102 receives instructions from central controller 104 instructing node A to adjust a packet header with the new path.

FIGS. 15B-15E are diagrams of example portions of a network with the four nodes A, B, C, and D. In particular, FIG. 15B shows that data packets are forwarded along the old path consisting of nodes A, B, and D (by the solid arrows representing active links). After receiving the instructions for nodes A, B, C, and D to program the new path (consisting of all four nodes A, B, C, and D), the nodes A, C, and D may successfully program the new path before node B programs the new path. This example is shown in FIG. 15C, in which a programmed link between nodes B and C is missing. Thus, if emulator 102 receives instructions from central controller 104 instructing node A to adjust a packet header with the new path (as at step 1508) before node B successfully programs the link in the new path, a data packet with an adjusted packet header may be forwarded to B before the link between nodes B and C is successfully programmed. This would lead to a conflict between the adjusted packet header in a data packet and a link along which node B is programmed to send data, resulting in an error. In particular, the error would result in data packets with adjusted packet headers being dropped at node B. At step 1509, emulator 102 identifies this error because node B has not yet been successfully programmed with the new path. FIG. 15D shows that the link between nodes B and C has been successfully programmed. After all the nodes have been successfully programmed with the new path (as determined at decision block 1406 in process 1400), the new network path is activated, and the old network path is removed as shown in FIG. 15E.

Returning now to FIG. 14, as another example, if central controller 104 had proceeded directly from step 1408 to step 1412 without determining whether node A has successfully adjusted the packet header, an error may occur. Specifically, the nodes may remove the old network path before a data packet header is successfully updated with the new network path. In this case, the data packet header is inconsistent with programmed network paths associated with the nodes, likely resulting in lost data packets. In this case, emulator 102 would perform validation tests after receiving the instructions at step 1408 and would identify any inconsistencies and errors.

The steps shown in FIG. 14 are for illustrative purposes only, and one of ordinary skill in the art will understand that the systems and methods disclosed herein are not limited to the presented order of the steps. As an example, central controller 104 may perform individual operations independently of one another or simultaneously. In particular, steps 1404 and 1412 may be performed simultaneously, such that nodes are simultaneously instructed to program the new network path and remove the obsolete network path.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclo-

The invention claimed is:

1. A method for validating policies for a network having a central controller for managing the network, comprising:
   connecting an emulator to the central controller, wherein the emulator is configured to emulate a plurality of nodes in the network;
   determining, by the emulator, a state value for each of one or more nodes of the plurality of nodes in the network, wherein the respective state values represent whether the corresponding respective node is in an error state;
   receiving, at the emulator, a first plurality of policies, wherein the first plurality of policies include instructions for the plurality of nodes in the network; and
   identifying whether the first plurality of policies are consistent with one another.

2. The method of claim 1, wherein the emulator is configured to emulate all nodes in the network that directly interface with the central controller.

3. The method of claim 1, wherein the determining a state value for one or more nodes comprises determining state values for all nodes in the network.

4. The method of claim 1, further comprising:
   selecting, by the emulator, a node; and
   verifying, by the emulator, that the instructions for the selected node are consistent with the state values of the selected node and neighboring nodes sharing direct communication links with the selected node.

5. The method of claim 1, further comprising:
   selecting, by the emulator, a node; and
   verifying, by the emulator, that the instructions for the selected node are consistent with the state values for all other nodes in the network.

6. The method of claim 1, further comprising updating, by the emulator, the state value for a node in the network, wherein the updated state value is based at least in part on the received instructions for the node.

7. The method of claim 6, further comprising repeating the receiving, identifying, and updating steps.

8. The method of claim 1, wherein the policies are routing policies including data forwarding instructions for the plurality of nodes.

9. The method of claim 8, wherein determining that the routing policies are inconsistent with one another comprises identifying data forwarding instructions for a first node in the network that conflict with data forwarding instructions for another node in the network.

10. The method of claim 1, further comprising:
    receiving, at the emulator, a second plurality of policies; and
    determining whether the first plurality of policies, the second plurality of policies, and the node state values are consistent with one another during a transition from the first plurality of policies to the second plurality of policies.

11. The method of claim 1, wherein the determining of the state value for each of the one or more nodes of the plurality of nodes in the network includes assigning a random state value for at least one of the one or more nodes.

12. The method of claim 1, wherein the determining of the state value for each of the one or more nodes of the plurality of nodes in the network includes assigning a pre-determined state value for at least one of the one or more nodes.

13. The method of claim 1, further comprising disconnecting a plurality of nodes from the central controller, wherein the emulator is configured to emulate the disconnected plurality of nodes.

14. The method of claim 13, further comprising selecting one or more policies from the plurality of policies, wherein disconnecting the plurality of nodes includes disconnecting those nodes associated with the selected policies.

15. The method of claim 1, further comprising transmitting, by the emulator, the determined state values to the central controller, wherein the central controller configures the first plurality of policies based at least in part on the determined state values.

16. The method of claim 1, further comprising storing, by the emulator, a network map of the network.

17. An emulator for validating policies for a network having a central controller for managing the network, comprising:
    an error scenario generator configured to determine a state value for each of one or more nodes of a plurality of nodes in a network, wherein the respective state values represent whether the corresponding respective node is in an error state;
    a central controller interface configured to receive a first plurality of policies from the central controller, wherein the first plurality of policies include instructions for the plurality of nodes in the network; and
    an emulation engine configured to identify whether the first plurality of policies are consistent with one another.

18. The emulator of claim 17, wherein the emulator is configured to emulate all nodes in the network that directly interface with the central controller.

19. The emulator of claim 17, wherein the error scenario generator determines state values for all nodes in the network.

20. The emulator of claim 17, wherein the emulation engine is further configured to:
    select a node; and
    verify that the instructions for the selected node are consistent with the state values of the selected node and neighboring nodes sharing direct communication links with the selected node.

21. The emulator of claim 17, wherein the emulation engine is further configured to:
    select a node; and
    verify that the instructions for the selected node are consistent with the state values for all other nodes in the network.

22. The emulator of claim 17, wherein the error scenario generator is further configured to update the state value for a node in the network, wherein the updated state value is based at least in part on the received instructions for the node.

23. The emulator of claim 22, wherein:
    the central controller interface is configured to repeatedly receive policies from the central controller;
    the emulation engine is configured to repeatedly identify whether the policies are consistent with one another; and
    the error scenario generator is configured to repeatedly update the state value for a node in the network.

24. The emulator of claim 17, wherein the policies are routing policies including data forwarding instructions for the plurality of nodes in the network.

25. The emulator of claim 24, wherein the emulation engine determines that the routing policies are inconsistent with one another by identifying data forwarding instructions for a first node in the network that conflict with data forwarding instructions for another node in the network.

26. The emulator of claim 17, wherein:
the central controller interface is further configured to receive a second plurality of policies; and
the emulation engine is further configured to determine whether the first plurality of policies, the second plurality of policies, and the node state values are consistent with one another during a transition from the first plurality of policies to the second plurality of policies.

27. The emulator of claim 17, wherein the error scenario generator determines the state value for each of the one or more nodes of the plurality of nodes in the network by assigning a random state value for at least one of the one or more nodes.

28. The emulator of claim 17, wherein the error scenario generator determines the state value for each of the one or more nodes of the plurality of nodes in the network by assigning a pre-determined state value for at least one of the one or more nodes.

29. The emulator of claim 17, wherein the emulator is configured to emulate the plurality of nodes in the network while at least some of the plurality of nodes are disconnected from the central controller.

30. The emulator of claim 29, further comprising a policy selector for selecting one or more policies from the plurality of policies, wherein the disconnected nodes are associated with the selected policies.

31. The emulator of claim 17, wherein the central controller interface is further configured to transmit the determined state values to the central controller, wherein the central controller configures the first plurality of policies based at least in part on the determined state values.

32. The emulator of claim 17, further comprising a database for storing a network map of the network.

* * * * *